United States Patent
Kitchel et al.

(10) Patent No.: US 10,323,948 B2
(45) Date of Patent: Jun. 18, 2019

(54) GPS DATA REPAIR

(71) Applicant: Strava, Inc., San Francisco, CA (US)

(72) Inventors: Davis Kitchel, Norwich, VT (US);
Brian Riordan, Norwich, VT (US)

(73) Assignee: Strava, Inc., San Francisco, CA (US)

( * ) Notice: Subject to any disclaimer, the term of this patent is extended or adjusted under 35 U.S.C. 154(b) by 0 days.

(21) Appl. No.: 15/357,625

(22) Filed: Nov. 21, 2016

(65) Prior Publication Data
US 2017/0131108 A1   May 11, 2017

Related U.S. Application Data

(63) Continuation of application No. 14/222,444, filed on Mar. 21, 2014, now Pat. No. 9,534,908, which is a continuation of application No. 13/788,908, filed on Mar. 7, 2013, now Pat. No. 8,718,927.

(60) Provisional application No. 61/609,847, filed on Mar. 12, 2012.

(51) Int. Cl.
| | |
|---|---|
| G01C 21/32 | (2006.01) |
| G01S 19/19 | (2010.01) |
| G01S 19/40 | (2010.01) |
| G01C 21/00 | (2006.01) |
| G06F 16/23 | (2019.01) |
| G01C 21/20 | (2006.01) |
| G01S 19/39 | (2010.01) |

(52) U.S. Cl.
CPC ............. *G01C 21/32* (2013.01); *G01C 21/00* (2013.01); *G01C 21/20* (2013.01); *G01S 19/19* (2013.01); *G01S 19/39* (2013.01); *G01S 19/40* (2013.01); *G06F 16/2308* (2019.01); *G06F 16/2365* (2019.01)

(58) Field of Classification Search
CPC .......... G01S 19/19; G01S 19/38; G01S 19/39; G01S 19/40; G01S 19/42; G01S 19/45; G01S 19/48; G01S 19/50; G06F 17/30241; G06F 17/30; G06F 17/30286; G06F 17/30345; G06F 17/30371; G01C 21/28; G01C 21/30; G01C 21/32
See application file for complete search history.

(56) References Cited

U.S. PATENT DOCUMENTS

| | | | | |
|---|---|---|---|---|
| 6,013,007 A | * | 1/2000 | Root | A63B 24/0006 482/8 |
| 7,672,778 B1 | | 3/2010 | Elliott | |
| 8,260,006 B1 | | 9/2012 | Callari | |

(Continued)

FOREIGN PATENT DOCUMENTS

WO   WO-2008030484 A2   3/2008

OTHER PUBLICATIONS

Shrivastava et al., "Fault Diagnostics for GPS-Based Lateral Vehicle Control," Jun. 2001, Proceedings of the American Control Conference.*

*Primary Examiner* — Thomas G Black
*Assistant Examiner* — Sara J Lewandroski
(74) *Attorney, Agent, or Firm* — Van Pelt, Yi & James LLP

(57) ABSTRACT

Repairing GPS data is disclosed. Repairing GPS data includes repairing an effort, comprising determining that the effort includes inaccurate GPS data; and adjusting the effort using a repaired base map. Repairing GPs data includes repairing a segment, comprising determining an inaccurate shape data in the segment; and adjusting shape data for the segment based on a repaired base.

18 Claims, 31 Drawing Sheets

(56) References Cited

U.S. PATENT DOCUMENTS

| | | | |
|---|---|---|---|
| 2005/0250458 A1* | 11/2005 | Graham | G06Q 30/02 |
| | | | 455/121 |
| 2007/0016553 A1* | 1/2007 | Dumais | H04L 51/34 |
| 2008/0082254 A1* | 4/2008 | Huhtala | G06F 19/00 |
| | | | 701/533 |
| 2008/0194916 A1* | 8/2008 | Limma | A61B 5/02438 |
| | | | 600/300 |
| 2008/0262721 A1* | 10/2008 | Guo | G01C 21/32 |
| | | | 701/532 |
| 2009/0043495 A1* | 2/2009 | Hattori | G01C 21/30 |
| | | | 701/532 |
| 2011/0320156 A1* | 12/2011 | Oohashi | G01C 21/165 |
| | | | 702/95 |

* cited by examiner

○ User Uploaded Data   FIG. 19
◇ TIGER Data
▰ Repaired Road

GPS DATA REPAIR

CROSS REFERENCE TO OTHER APPLICATIONS

This application is a continuation of co-pending U.S. patent application Ser. No. 14/222,444, entitled GPS DATA REPAIR filed Mar. 21, 2014 which is incorporated herein by reference for all purposes, which is a continuation of Ser. No. 13/788,908, now U.S. Pat. No. 8,718,927 entitled GPS DATA REPAIR filed Mar. 7, 2013 which is incorporated herein by reference for all purposes, which claims priority to U.S. Provisional Patent Application No. 61/609,847 entitled TECHNIQUES TO IMPROVE ACCURACY OF GPS-BASED DATA filed Mar. 12, 2012 which is incorporated herein by reference for all purposes.

BACKGROUND OF THE INVENTION

A common problem with global positioning satellite (GPS) data is that it is often measured with error. The error included in measured GPS data may detrimentally affect the comparison between a first set of GPS data and a second set of GPS data such that even if the two sets of GPS data were recorded along similar geographic paths, the two sets of GPS data may not be determined to be sufficiently similar to each other. Furthermore, in the event that a set of GPS data was recorded during a user's physical activity across a geographic track, if the set of GPS data was recorded with sufficient error, then computations regarding the user's performance (e.g., speed, acceleration) during the physical activity may not be accurately determined.

BRIEF DESCRIPTION OF THE DRAWINGS

Various embodiments of the invention are disclosed in the following detailed description and the accompanying drawings.

DETAILED DESCRIPTION

Figure 1:
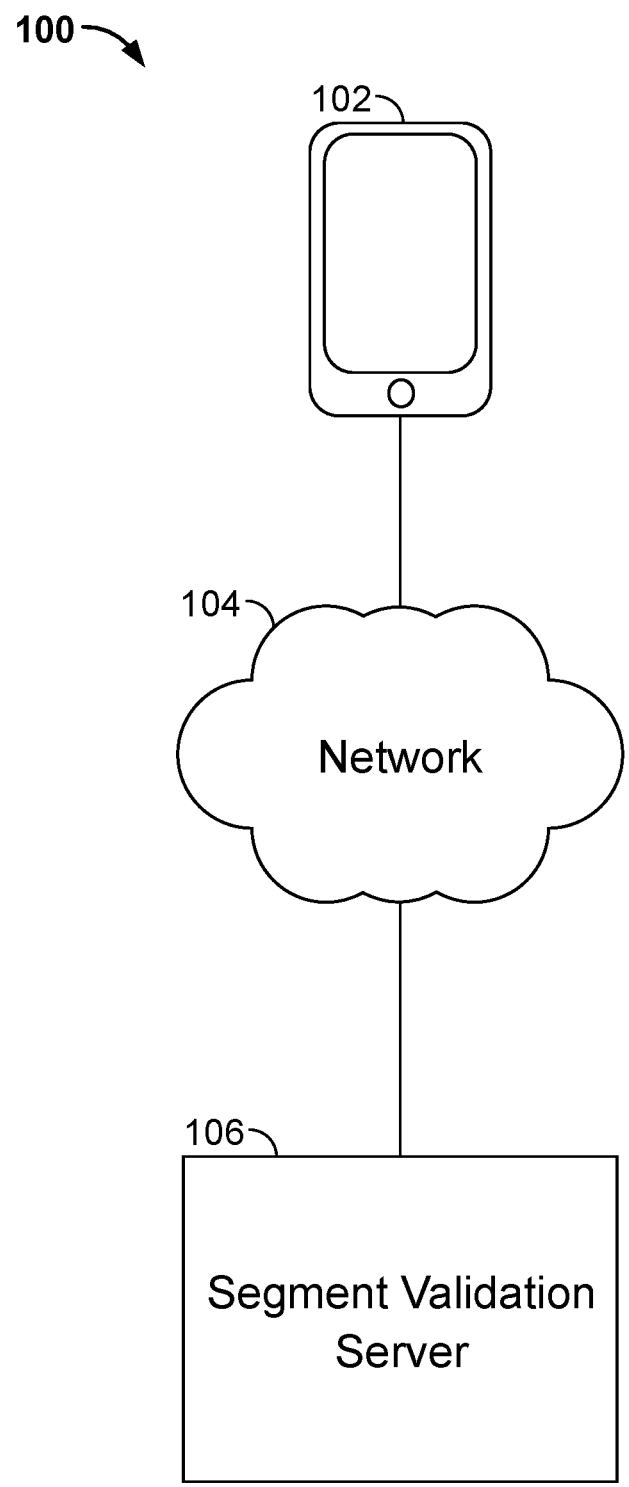
FIG. 1 is a diagram showing an embodiment of a system for validating segments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a segment refers to a representation of a real-world geographical track (e.g., route, path, trail) that is of interest and can be used as a reference (e.g., for comparison of athletic performances along that track and/or for other applications). For example, a segment can be used to identify a popular hill climb for cyclists, a running route, or a hiking trail. In various embodiments, a segment may be automatically defined. For example, third party sources that store information regarding common paths for various physical activities may be used to automatically define segments. In various embodiments, a segment may be defined by a user. For example, a user may make selections along a map at a user interface to draw out the segment. In another example of a user defined segment, a user may record an effort and define at least a portion of the GPS data associated with the effort as the segment. As used herein, an effort refers to a recorded series of GPS data with timestamps (e.g., which can represent an instance of a user's athletic performance or physical activity). In some embodiments, an effort is stored with auxiliary data (e.g., metrics of the activity with which the effort is associated). A segment may be stored so that, for example, it can be used as reference to which a recorded effort can be determined to match so that the effort can be, if desired, compared against one or more other recorded efforts that also match the same segment. In various embodiments, an effort is determined to match a segment by meeting matching criteria associated with the segment. In various embodiments, an effort that matches a segment is referred to as a "segment match" or a "matching effort to the segment." In some embodiments, data indicating a matching relationship is stored for each segment effort (i.e., matching effort) with respect to the segment that the effort has been determined to match.

However, a stored segment may need to be updated over time because it may have been defined with error. An example of a segment that may be defined with an error is a segment that is derived from the GPS data of a recorded effort. Specifically, recorded GPS data may include measures of latitude and longitude ("Lat-Lng Data") and time. Auxiliary data such as a user's heart rate, air temperature, elevation above sea level, power output, or another physiological, performance, or environmental parameter, for example, may be captured by the device at the same points in time as Lat-Lng Data. The GPS-enabled device that was used to record the effort may record GPS data with error, which is then passed to the segment that is defined from the effort. There are several kinds of errors that can corrupt the GPS data. For example, one type of error may be caused by the GPS-enabled device losing connection with one or more of the satellites that it needs to accurately track Lat-Lng Data. Another type of error may be caused by the device measuring data too infrequently to correctly pinpoint data being collected at all points and times. Yet another type of error may be caused by the device having a limited degree of accuracy such that it misinterprets Lat-Lng Data by introducing "drift" to the Lat-Lng Data. Furthermore, a stored segment may need to be updated over time because the geographic track that it is intended to represent may change over time. For example, the terrain of a trail that a segment was originally defined to represent may shift over time, which will cause the originally defined segment to become a less accurate representation.

Embodiments of validating segments are described herein. In various embodiments, validating a segment comprises adjusting at least some GPS data associated with (e.g., representing) the segment using aggregated GPS data. In various embodiments, the aggregated GPS data includes the GPS data of one or more efforts that were determined to match the segment. In some embodiments, validating the segment comprises generating a new version of the segment based on adjusting the GPS data associated with the stored segment using the aggregated GPS data. In some embodiments, the new version of the segment will replace the stored segment (the previous version of the segment) because it is assumed to be a more accurate representation of the geographic track that the stored segment was intended to represent. In some embodiments, the GPS data of one or more efforts determined to match the new version of the segment may be subsequently used to validate that segment. Subsequent validation of the segment may be iteratively performed.

FIG. 1 is a diagram showing an embodiment of a system for validating segments. In the example, system 100 includes device 102, network 104, and segment validation server 106. Network 104 includes high-speed data networks and/or telecommunications networks. Device 102 may communicate to segment validation server 106 over network 104. In some embodiments, system 100 may include more or fewer components than what is shown in the example of FIG. 1.

Device 102 is a device that can record GPS data and/or other data associated with a physical activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800), a mobile phone, such as a smart phone (e.g., an Android®-based device or Apple iPhone® device) including a GPS recording application (e.g., MotionX®, Endomondo®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an application thereof) is configured to record GPS data and auxiliary data associated with a physical activity during the activity. For example, auxiliary data associated with a physical activity may include physiological, environmental, and/or performance data. In some embodiments, device 102 is configured to receive recorded GPS data and auxiliary data associated with a physical activity subsequent to the completion of the activity (e.g., such information is uploaded to device 102).

In some embodiments, the recorded GPS data and the auxiliary data that represent an instance of a physical activity are referred to as an "effort." Put another way, an effort is an instance of a physical activity and can be represented through its geographical information as well as other metrics related to athletic performance. Examples of a physical activity include cycling, running, and skiing. In some embodiments, GPS data includes a series of consecutive and discrete GPS data points (e.g., latitude and longitude coordinates sometimes referred to as "Lat-Lng Data") with a timestamp for each point. In some embodiments, auxiliary data includes, but is not limited to, elevation, heart rate, power/watts (e.g., energy expended), time, speed (e.g., average and/or maximum speed per segment and/or route, in which average speed, for example, can be derived from time and GPS information), and/or cadence. Auxiliary data can be recorded at various granularities. For example, auxiliary data can correspond to each GPS data point, the entire activity (e.g., the auxiliary data includes averages of the metrics), or portions of the activity. As an example, one can use device 102 on a bike ride. At the end of the bike ride, the user can review his performance with the recorded GPS data (e.g., through a user interface of device 102) to observe the geographical track that he traversed, how much energy he expended along the ride, how fast he finished it in, average speed, elevation-based metrics, and/or other metrics. In some embodiments, device 102 is configured to store the recorded GPS data and the auxiliary data (e.g., effort) and/or send the effort information to server 106. In some embodiments, device 102 is configured to present an interactive user interface. The user interface may display GPS data and receive selections (e.g., made by a user) with respect to the displays. In some embodiments, device 102 sends the selections that it receives to segment validation server 106.

In some embodiments, a user interface may be presented at device 102. In some embodiments, the user interface may be presented by segment validation server 106 or by another component that is not shown in the example of FIG. 1. The user interface is configured to receive a user definition of a segment. In some embodiments, the user interface is configured to display a visual representation of the GPS data of a recorded effort at the user interface using a map software application. The visual representation can be, for example, a series of flags or a continuous line marked on a graphical map. In some embodiments, segment validation server 106 is able to support a map at the user interface by including logic configured to interact with the Application Programming Interface (API) of a map software/application (e.g., Google® Maps, MapQuest®, Bing® maps, and/or another mapping application/service). In some embodiments, a user may define a segment using the visual representation of the GPS information. In some embodiments, a start point and a finish (e.g., end) point along the visual representation of the GPS information are selected on the graphical map to define a segment. For example, a user may select (e.g., by dropping a marker or clicking) the start and/or finish points along the geographical track that he or she just traversed during a physical activity. The portion of the geographical track between the selected start and finish points is thus defined as a segment. In some embodiments, the start and finish points are stored with the defined segment. In some embodiments, the portion of the geographical track between the selected start and finish points is converted into an abstracted form and then stored in a database for storing segments. In some embodiments, the associated data that corresponds to the defined segment is also stored with the segment at the database.

In some embodiments, the user interface is configured to receive a user definition of a segment using selections on a map without a visual representation of a recorded effort. In some embodiments, a graphical map (e.g., Google® Maps, MapQuest®) is presented and a series of selections of points on the map to indicate the course of a segment is received. This series of selections of points on the map need not be based on a recorded effort and can merely be any geographical track that is of interest. For example, the selected segment can be a track that a cyclist has rode over before but has not documented the ride or the selected segment can be a track that the cyclist would like to ride on in the future. The series of selections of points on the map can be converted into a series of GPS data (e.g., Lat-Lng Data). In some embodiments, the series of GPS data is converted into an abstracted form and then stored as a segment.

In some embodiments, subsequent to a definition of a segment at the user interface, stored efforts (e.g., sets of GPS data from past physical activities) are compared to the defined segment. In some embodiments, when an effort is compared against this defined segment, it is determined whether the effort matches the segment in part by checking whether the GPS data of the effort indicates that the start point and/or finish point of the segment have been crossed. In some embodiments, identifiers associated with matching efforts are stored for each segment.

Segment validation server 106 is configured to validate a stored segment. In various embodiments, segment validation server 106 is configured to validate a stored segment based on aggregated GPS data associated with the segment. In some embodiments, aggregated GPS data associated with the segment includes at least some of the efforts that have been determined to match the segment. In some embodiments, segment validation server 106 is configured to start validation of a stored segment in response to a trigger to start the validation process. In response to the trigger, in some embodiments, segment validation server 106 is configured to use at least some of the GPS data associated with one or more efforts that have been determined to match the segment to adjust the GPS data associated with the segment. In some embodiments, adjusting the GPS data associated with the segment includes generating a new version of the segment. In some embodiments, the new version of the segment may comprise a modified version of the set of GPS data associated with the previous version of the segment. In some embodiments, the new version of the segment may also be referred to as the "validated segment." In some embodiments, the validated segment will replace the previous version of the segment. In some embodiments, stored efforts, if any, that match the validated segment are determined. In some embodiments, segment validation server 106 is configured to validate the validated segment based on aggregated GPS data (e.g., GPS data that matches the validated segment). In this manner, segment validation server 106 is configured to iteratively, over time, validate a segment using aggregated GPS data associated with the segment (e.g., GPS data associated with efforts that match the segment).

Validating a segment leverages a body of relevant user submitted GPS data to generate a more accurate and/or more current representation of the intended geographic track. In some embodiments, only a portion of the relevant user submitted GPS data recorded by one or more GPS devices that are known to be more accurate may be selected to validate the segment, to increase the accuracy of the validation process. More accurate segments can provide better matches to recorded efforts and therefore increase the probability that an effort recorded along a certain geographic track will be determined to match the segment defined to represent that geographic track.

Figure 2:
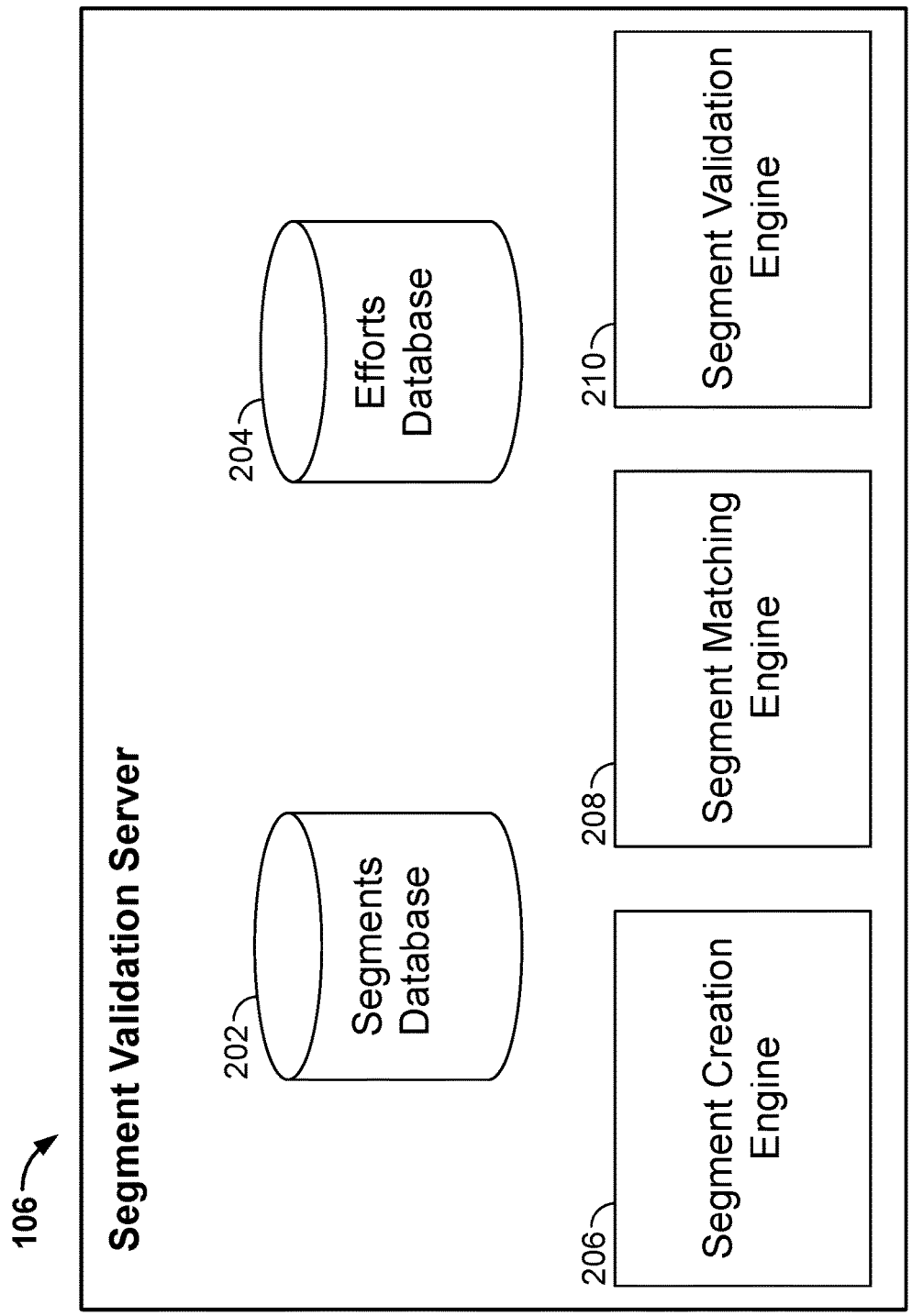
FIG. 2 is a diagram showing an embodiment of a segment validation server.

FIG. 2 is a diagram showing an embodiment of a segment validation server. In some embodiments, segment validation server 106 of system 100 of FIG. 1 may be implemented using the example of FIG. 2. In some embodiments, a segment validation server may include more or fewer components than what is shown in the example of FIG. 2. The example of the segment validation server includes segments database 202, efforts database 204, segment creation engine 206, segment matching engine 208, and segment validation engine 210. Each of segments database 202 and efforts database 204 may be implemented using one or more databases. Each of segment creation engine 206, segment matching engine 208, and segment validation engine 210 may be implemented using one or both of hardware and software.

Segments database 202 is configured to store segments. In some embodiments, segments database 202 is configured to store segments derived from recorded user efforts. In some embodiments, segments database 202 is configured to store segments generated by user selections along a map application (independent of a recorded effort). In some embodiments, segments database 202 is configured to store segments generated based on third party sources. In some embodiments, a segment is stored as a set of GPS data. In some embodiments, the set of GPS data associated with a segment is converted into an abstracted form (e.g., minimum bounding rectangles) and the converted data is stored to represent the segment. In some embodiments, each segment is stored with a set of metadata. For example, the set of metadata associated with each segment may include an identifier associated with the segment, a number of times that a segment associated with the segment identifier has been validated/refined (e.g., a version number of the segment associated with the segment identifier), identifiers of stored efforts that have been determined to match the segment (e.g., within a recent period of time or since the last time the segment was validated), a time at which the segment associated with the identifier was originally created, and one or more types of physical activity that are associated with the segment (e.g., running and biking). In some embodiments, if a segment has been validated at least once previously, then at least one or more previous versions of the segment may be stored (but not used to match to efforts).

In some embodiments, each segment stored at segments database 202 is associated with one or more matching criteria. If an effort is determined (e.g., by segment matching engine 208) to meet the criteria associated with a segment, then the effort is determined to match the segment and data indicating the matching relationship between the segment and the effort may be stored with the segment and/or the effort. For example, matching criteria associated with a segment may include a threshold degree of similarity that an effort has to meet in order to match the segment. In some embodiments, each segment stored at segments database 202 is associated with the same set of matching criteria. In some embodiments, different segments stored at segments database 202 may be associated with different sets of matching criteria.

Segment creation engine 206 is configured to receive user definition of segments. In some embodiments, segment creation engine 206 is configured to present a user interface associated with segment definition. In some embodiments, a user may submit to segment creation engine 206 a set of GPS data associated with a recorded effort and segment creation engine 206 is configured to present a visual representation of the effort at the user interface. Then user selections associated with a start point and end point along the visual representation of the GPS data associated with the effort are received and segment creation engine 206 is configured to store at least the portion of the GPS data associated with the effort between the start point and the end point as a segment at segments database 202, for example. In some embodiments, segment creation engine 206 is configured to present a map application (e.g., associated with a third party service such as Google® maps) at the user interface and receive one or more user selections (e.g., user clicks along a path on the map) with respect to the map application. The one or more user selections on the map application are then converted into a set of (e.g., GPS) data and stored as a segment at segments database 202, for example. In some embodiments, segment creation engine 206 is configured to prompt the user (via the user interface) to input metadata associated with the segment. For example, the user may be prompted to input an identifier for the segment and one or more types of physical activity associated with the segment.

Efforts database 204 is configured to store user recorded and uploaded efforts. In some embodiments, an effort is recorded during a user's physical activity by a GPS-enabled device. Examples of a user's physical activity may include biking or running. Examples of a GPS-enabled device may include a GPS-enabled smart phone with an application associated with recording GPS data installed or a GPS-enabled watch. For example, a user can wear a GPS-enabled device on his body as he performs a physical activity. The user can interact with the device to start and end recording. While the device is in the recording mode, it may record discrete data points, where each data point may be associated with a GPS coordinate (e.g., Lat-Lng coordinates), a time association, and one or more physical, physiological, environmental, and/or performance related metrics (e.g., heart rate, cadence, power, speed, acceleration). In some embodiments, a user interface may be provided for the user and the user may upload a recorded effort using at least the user interface. For example, the user can establish a wired or wireless connection between the GPS-enabled device and a computer to upload the data associated with the recorded effort(s), direct the web browser installed at the computer to a web address associated with the user interface, and upload the data associated with the recorded effort(s) to the segment validation server. Furthermore, the user interface may prompt the user to provide metadata to be associated with an uploaded effort such as, for example, an identifier, a type of physical activity associated with the effort, an identifier associated with the type of device the effort was recorded with, an identifier of a user associated with the effort, and additional notes. In some embodiments, the set of metadata associated with an effort may be updated over time. For example, over time, an effort may be determined to match different or additional segments.

In some embodiments, an effort stored at efforts database 204 is matched against one or more segments stored at segments database 202. For example, subsequent to a user uploading a recorded effort to the segment validation server, segment matching engine 208 is configured to compare the effort against each of the segments stored at segments database 202, for example, to determine whether the effort matches one or more segments. In some embodiments, an effort is determined to match a segment based on the set of GPS data associated with the effort meeting one or more matching criteria associated with the segment. In the event that an effort is determined to match a segment (e.g., stored at segments database 202), the effort is then stored with an identifier associated with the matching segment. As such, if efforts that match a certain segment are to be determined, then the efforts of efforts database 204 can be searched for those that are associated with the segment's identifier.

Segment matching engine 208 is configured to match efforts to stored segments. In some embodiments, segment matching engine 208 is configured to determine whether at least some efforts stored at efforts database 204 match one or more segments stored at segments database 202. Segment matching engine 208 is configured to determine whether an effort meets the one or more matching criteria associated with a particular segment. In the event that segment matching engine 208 determines that an effort matches a segment, then data indicating the matching relationship between the segment and effort may be stored with the segment and/or the effort.

Segment validation engine 210 is configured to validate segments. A goal of segment validation is to continuously improve the quality of a segment and to change the segment, if appropriate, to better reflect the true (e.g., real-world) geographical track that the segment is supposed to represent. In some embodiments, segment validation engine 210 validates at least some of the segments stored at segments database 202. Segment validation engine 210 validates a segment based on aggregated GPS data. In some embodiments, segment validation engine 210 performs validation on a segment that meets one or more validation criteria. For example, a validation criterion is that a predetermined period of time has passed since the segment has been created or last validated. Another example of a validation criterion is that a predetermined number of efforts (e.g., recorded by a particular GPS-enabled device) has been determined to match the segment. Yet another example of a validation criterion is that less than a predetermined threshold of efforts has been determined to match the segment since the segment has been created or last validated.

Once segment validation engine 210 determines that a stored segment has met at least one validation criterion, segment validation engine 210 proceeds to validate the segment. In some embodiments, segment validation engine 210 is configured to validate a stored segment based on aggregated GPS data including at least the set of efforts that have been determined to match the segment. For example, segment validation engine 210 can query efforts database 204 for the efforts that have been determined to match the segment to be validated (e.g., based on metadata stored with the efforts). In some embodiments, segment validation engine 210 is configured to use at least the obtained efforts (e.g., the efforts' corresponding sets of GPS data) that have been determined to match the segment to validate the segment. In some embodiments, segment validation engine 210 is configured to generate a new version of the segment based on the obtained set of efforts. In some embodiments, segment validation engine 210 is configured to replace the previous version of the segment with the new version of the segment as a result of the validation. In some embodiments, the new version of the segment, which is sometimes referred to as the "validated segment," is stored with at least some of the metadata (e.g., segment identifier) associated with the previous version of the segment so as to replace the previous version. In some embodiments, the metadata associated with the new version of the segment may be updated to include an incremented version number. In some embodiments, segment validation engine 210 is configured to match one or more efforts (from efforts database 204) to the validated segment. As a result of the validation, more, fewer, or different efforts may be determined to match the segment. In various embodiments, segment validation engine 210 is configured to iteratively validate a segment based on aggregated GPS data. For example, the new version of the segment (the validated segment) may eventually meet a validation criterion and become validated by segment validation engine 210 based on the efforts that have been determined to match that version of the segment.

Because a segment may be originally derived from the GPS data associated with a recorded user effort, sometimes the error included in the recording of the effort may be passed onto the resulting segment. As a result, certain efforts that were recorded with greater accuracy along the geographic track that a segment was intended to represent may not be determined to match the segment, which will negatively affect users' ability to compare performances along the same geographic track. However, by continuously updating/validating an existing segment using at least aggregated user GPS data that is relevant to the segment (e.g., matching efforts), the segment may be continually improved to more accurately reflect the current real-world shape of the geographic track.

Figure 3:
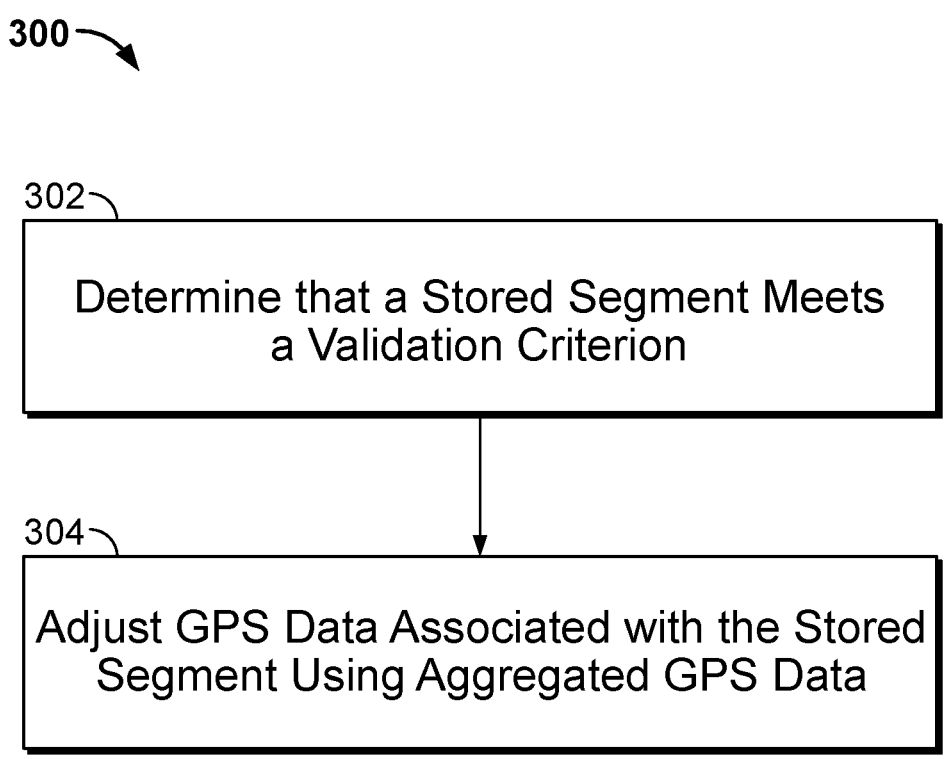
FIG. 3 is a flow diagram showing an embodiment of a process of validating a segment.

FIG. 3 is a flow diagram showing an embodiment of a process of validating a segment. In some embodiments, process 300 is implemented at system 100 of FIG. 1.

At 302, it is determined that a stored segment meets a validation criterion. In some embodiments, segment validation for a stored segment begins when the segment meets a validation criterion. In some embodiments, one or more validation criterion may be user configured. A first example of a validation criterion is an elapse of a predetermined time interval since the segment was last validated or since the segment's initial creation. A second example of a validation criterion is when less than a predetermined number of efforts are determined to match the segment within a predetermined period of time (e.g., the lack of matching efforts may indicate that the segment was created with significant error). A third example of a validation criterion is when the number of efforts that match the segment has reached a predetermined threshold. A fourth example of a validation criterion is when the number of efforts recorded by a selected device (e.g., that is known to be relatively more accurate than other devices) that match the segment has reached a predetermined threshold. A fifth example of a validation criterion is receipt of an indication of a user selection to initiate the validation process.

At 304, GPS data associated with the stored segment is adjusted using aggregated GPS data. In various embodiments, sets of GPS data associated with the segment are aggregated and used to adjust the GPS data associated with the segment. In some embodiments, sets of GPS data associated with the segment comprise the GPS data associated with the efforts that have been determined to match the segment. In some embodiments, the sets of GPS data corresponding to the matching efforts are obtained and used to generate a new version of the segment. In some embodiments, the new version of the segment is used to replace the previous version of the segment.

Figure 4:
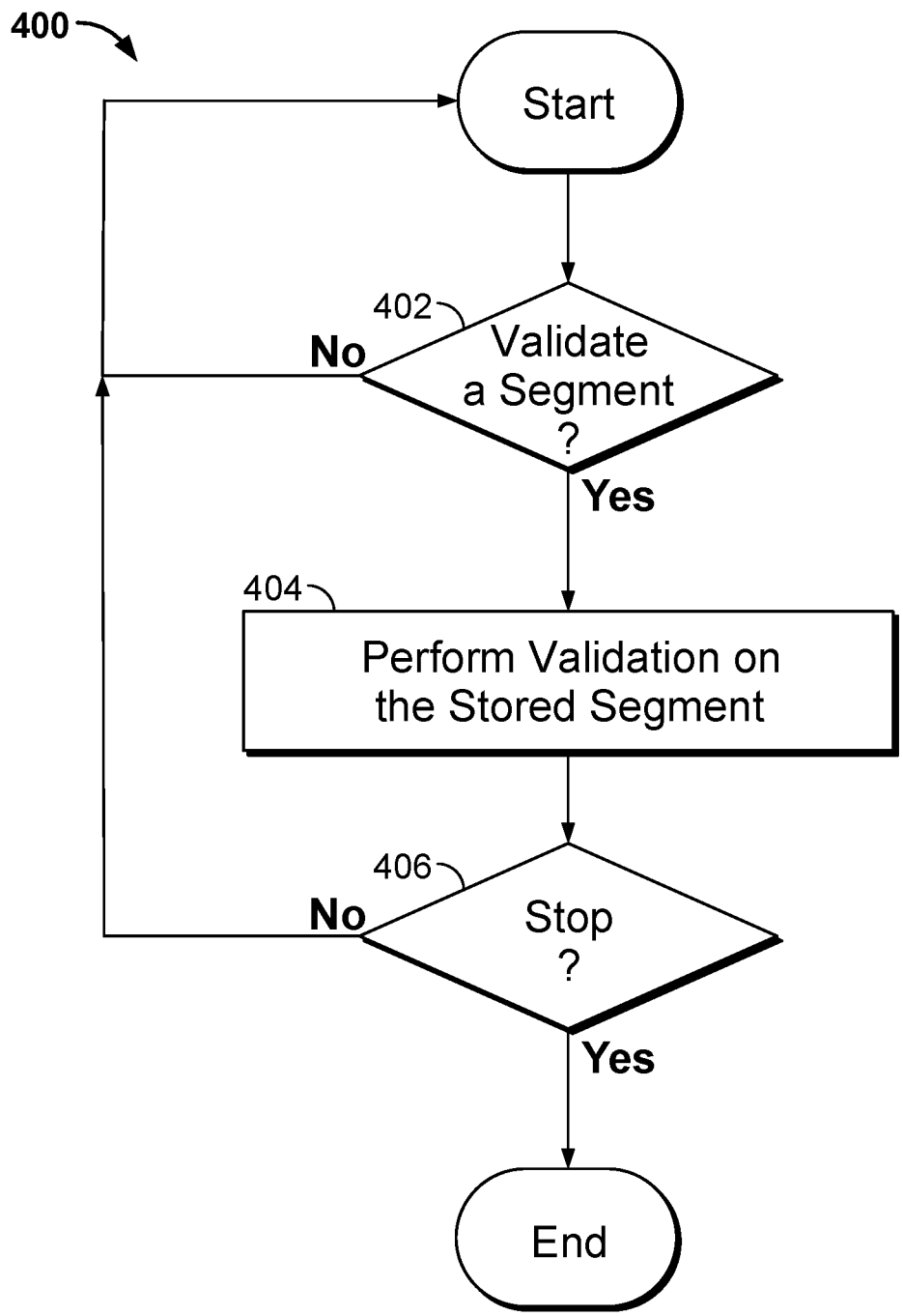
FIG. 4 is a flow diagram showing an embodiment of a process for performing segment validation.

FIG. 4 is a flow diagram showing an embodiment of a process for performing segment validation. In some embodiments, process 400 is performed at system 100 of FIG. 1.

Process 400 shows that a segment may be repeatedly validated to further improve the accuracy and quality of the segment. In some embodiments, process 400 is performed for each stored segment.

At 402, it is determined whether a segment is to be validated. In some embodiments, the segment is determined to be validated based on the segment meeting at least one validation criterion. Examples of validation criterion include an elapse of a predetermined time interval since a previous validation or creation of the segment, when the number of efforts determined to match the segment reaches a predetermined threshold number, when the number of matching efforts is less than a predetermined number during a predetermined period of time, and when an indication associated with a user selection for the segment to be validated is received.

At 404, validation is performed on the stored segment. In some embodiments, aggregated GPS data associated with the segment is used to perform validation of the segment. In some embodiments, as a result of the validation, a new version of the segment is generated and used to replace the previous version of the segment.

At 406, it is determined whether to stop validation of the segment. For example, the cycle of segment validation may be stopped in response to a user selection to stop the process or in response to the system losing power. In the event that validation is determined to be stopped, process 400 ends. Otherwise, in the event that validation is determined to continue, control passes to the start of 400. For example, after one iteration of step 404, the new version of the segment is determined to replace the previous version of the segment. Then when the next iteration process 400 is performed, this new version of the segment is determined to be validated.

Figure 5:
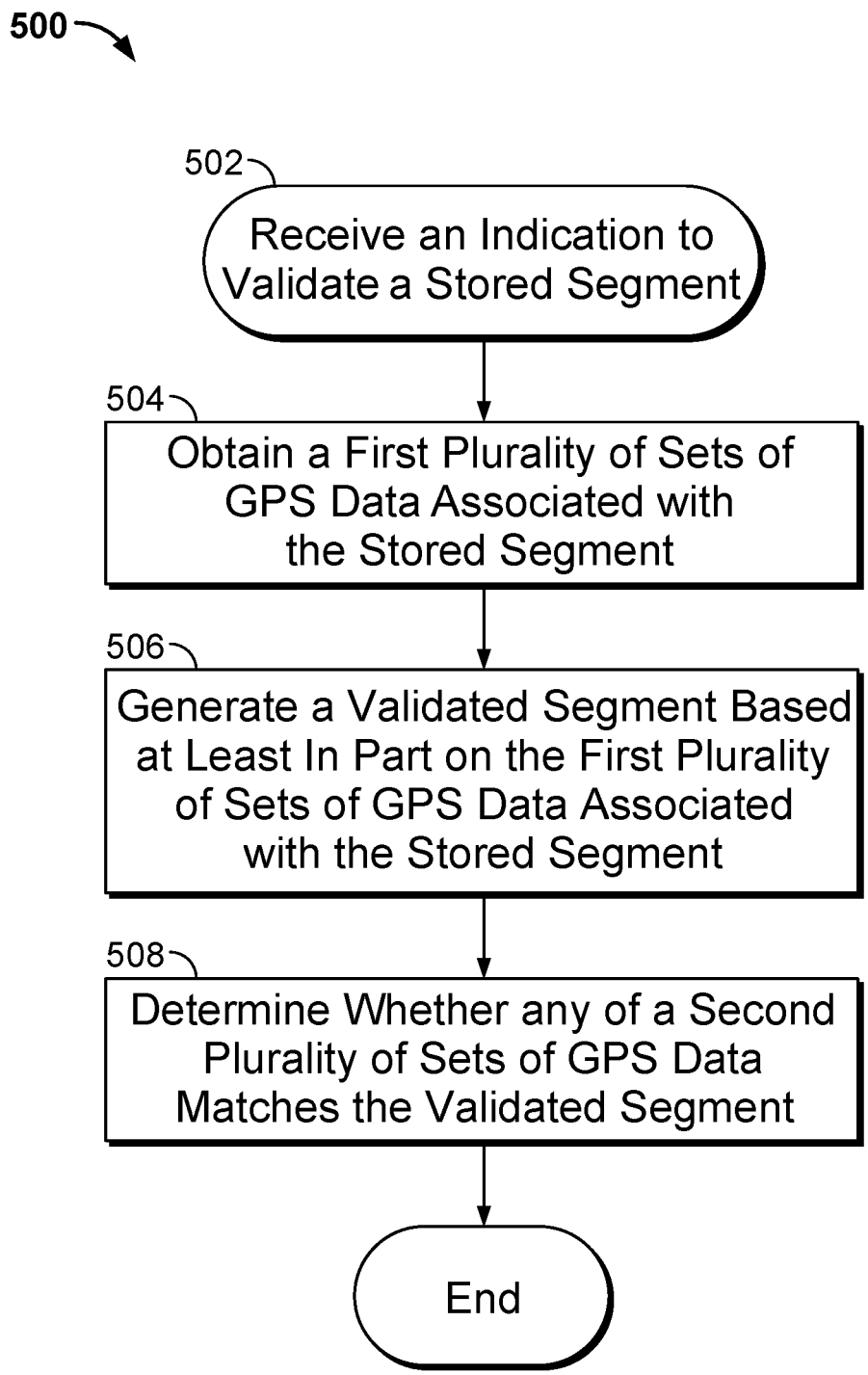
FIG. 5 is a flow diagram showing an embodiment of a process of validating a segment.

FIG. 5 is a flow diagram showing an embodiment of a process of validating a segment. In some embodiments, process 500 is performed at system 100 of FIG. 1. In some embodiments, step 404 of process 400 of FIG. 4 is performed using at least a portion of process 500.

Process 500 shows that efforts may be compared against a newly generated validated segment (i.e., a new version of a segment generated from validating a segment).

At 502, an indication to validate a stored segment is received. For example, the stored segment is determined to have met a validation criterion.

At 504, a first plurality of sets of GPS data associated with the stored segment is obtained. In some embodiments, the first plurality of sets of GPS data comprises the sets of GPS data corresponding to the efforts that have been determined to match the stored segment since the segment was initially created or was last validated.

At 506, a validated segment is generated based at least in part on the first plurality of sets of GPS data associated with the stored segment. In some embodiments, the validated segment comprises a new version of the segment generated based on the set of efforts that had been determined to match the segment. In some embodiments, the previous version of the segment, which is the version of the segment prior to the current validation process, is replaced by the new version of the segment. In some embodiments, replacing a segment with a new version of the segment includes discarding the segment and storing the new version of the segment with at least some of the metadata that was stored for the discarded version. In some embodiments, the metadata associated with the new version of the segment includes an incremented version number.

At 508, it is determined whether any of a second plurality of sets of GPS data matches the validated segment. In some embodiments, the set of stored efforts is compared against the new version of the segment to determine which efforts match this new version. Sometimes, the validated segment (the new version of the segment) may differ from the previous version of the segment enough such that efforts that did not previously match the previous version of the segment may match this new version and/or efforts that previously did match the previous version of the segment may not match the new version of the segment. In some embodiments, identifiers of efforts that are determined to match the new version of the segment are stored with the segment so that such efforts may be used, in the future, to validate the formerly new version of the segment.

Figure 6:
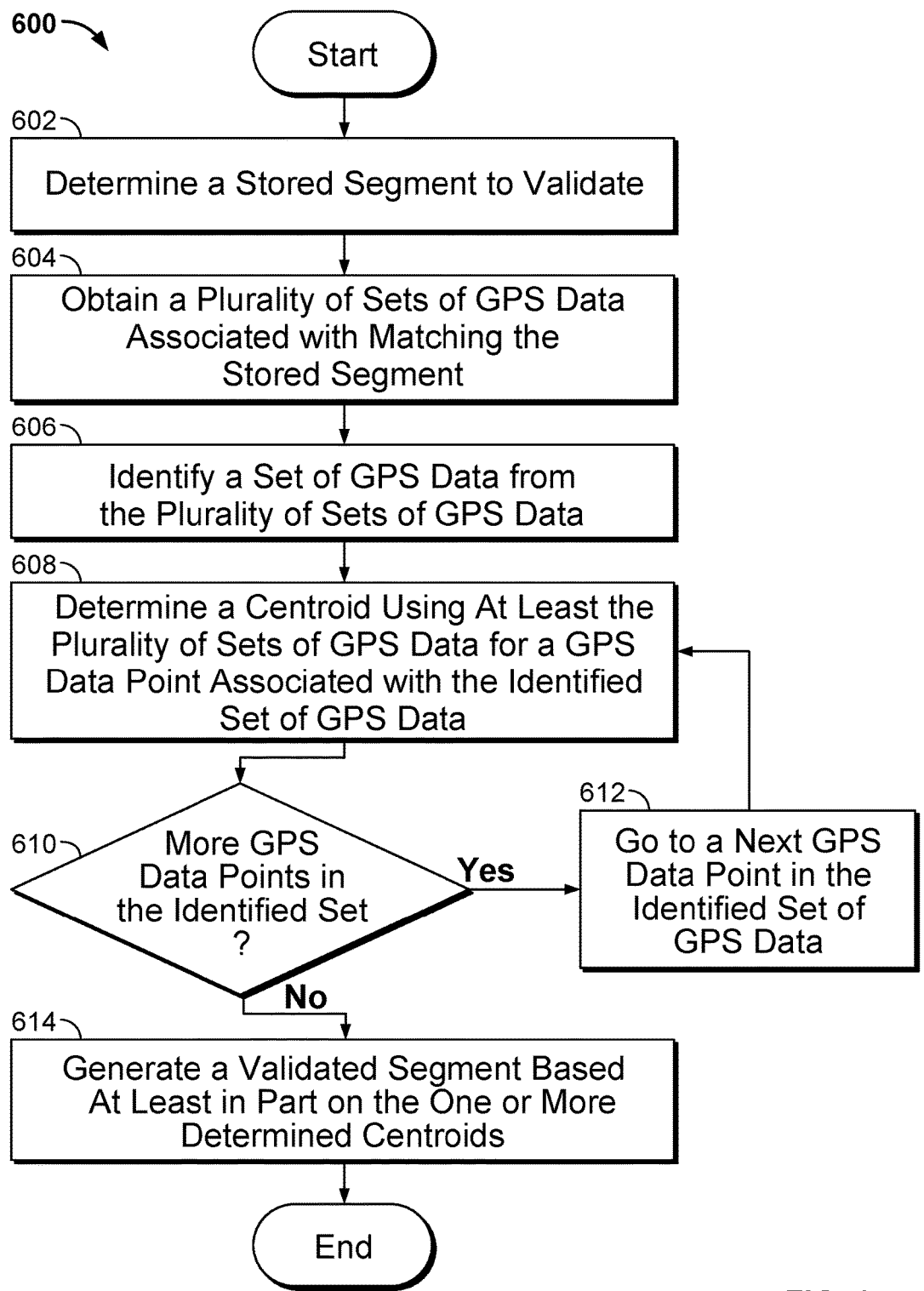
FIG. 6 is a flow diagram showing an example of determining a validated segment.

FIG. 6 is a flow diagram showing an example of determining a validated segment. In some embodiments, process 600 is performed at system 100 of FIG. 1. In some embodiments, steps 502, 504, and 506 of process 500 of FIG. 5 are performed using process 600.

At 602, a stored segment to validate is determined. For example, the stored segment is determined to have met a validation criterion.

At 604, a plurality of sets of GPS data associated with matching the stored segment is obtained. In some embodiments, the plurality of sets of GPS data associated with matching the stored segment is associated with the efforts that have been determined to match the stored segment.

At 606, a set of GPS data from the plurality of sets of GPS data is identified. In some embodiments, the set of GPS data associated with one of the matching efforts is identified based on one or more factors. Each found matching effort may be thought as a candidate effort and the identified effort may be referred to as the "best candidate effort." For example, tests may be applied to each of a subset of the candidate efforts that are recorded by a selected device (e.g., a device being selected for being known to record with relatively more accuracy) and the candidate effort associated with the highest score based on the given tests is identified. In some embodiments, the candidate effort identified as the "best candidate effort" is the effort that is determined to likely be the most accurate effort (e.g., the effort that was recorded with the most accuracy). In some embodiments, the best candidate effort is identified by "walking along" each candidate effort and measuring a count of found GPS data points associated with other candidate efforts within a given radius of each GPS data point along that candidate effort. Each GPS data point is of standard distance interval from the previous and the next GPS data point from start to end of the candidate effort. A sum is determined for each candidate effort based on adding together the count of found GPS data points within the given radius of each of the candidate effort's GPS data points. The candidate effort that has the highest sum is determined to be the best candidate effort because it is closest to a centroid of the group of candidate efforts and as will be described below, the validated segment is determined by finding centroids associated with the group of candidate efforts.

At 608, a centroid using at least the plurality of sets of GPS data for a GPS data point associated with the identified set of GPS data is determined. In some embodiments, each GPS data point of the best candidate effort is "walked along" to determine a centroid based on nearby GPS data points associated with at least some other candidate efforts. For example, for a given GPS data point of the best candidate effort (e.g., starting with the first recorded GPS data point), a radius of a certain distance is swept out around this GPS data point and at least some GPS data points associated with other candidate efforts within the swept out circle are used to determine a centroid. In some embodiments, only a subset of all candidate efforts is considered in validating the segment. In a specific example, only candidate efforts that were recorded by a selected device (e.g., a Garmin Edge® 800) are considered in validating the segment and so in determining a centroid for each GPS data point included in the best candidate effort, only GPS data points of efforts recorded by the selected device that are included in the radius of a certain distance from the GPS data point are used to find the centroid.

In some embodiment, the centroid technique also filters out GPS data points that are not going in the same general direction as the current best candidate effort GPS data point that is under consideration (i.e., GPS data points of candidate efforts that are not the best candidate efforts are not used to determine the centroid if they are not in the same general direction as the best candidate effort GPS data point). This way, when there is a tight hairpin turn such that GPS data points blend together from both sides of the hairpin, only the GPS data points going in the same general direction of the best candidate effort GPS data point are considered—therefore avoiding using GPS data points that are going in the wrong direction and making for a correct path around the turn. In some embodiments, the technique of finding a centroid is iterated through a predetermined number of times (e.g., four times) to determine the centroid. The rational for the multiple iterations is that a main corridor could be initially only touched by the area of the circle around the GPS data point of a best candidate effort—such that the centroid of those found GPS data points is still outside of the main corridor of GPS data points. It is found that multiple iterations enable the centroid to "march" to the corridor, and once there—it will stay there.

At 610, it is determined whether there are more GPS data points in the identified set. In the event that it is determined there are more GPS data points included in the best candidate effort, control passes to 612. Otherwise, control passes to 614.

At 612, the next GPS data point in the identified set of GPS data is considered and control returns to 608. The next GPS data point (e.g., the GPS data point recorded next in time) of the best candidate effort is considered until each GPS data point of the best candidate effort is walked along to create a new centroid based on step 608.

At 614, a validated segment is generated based at least in part on the one or more determined centroids. In some embodiments, the centroids created based on walking along each GPS data point of the best candidate effort are connected to form the new version of the segment that is to replace the previous version.

FIGS. 7 through 13 illustrate an example of performing process 600 of FIG. 6 to validate a segment.

Figure 7:
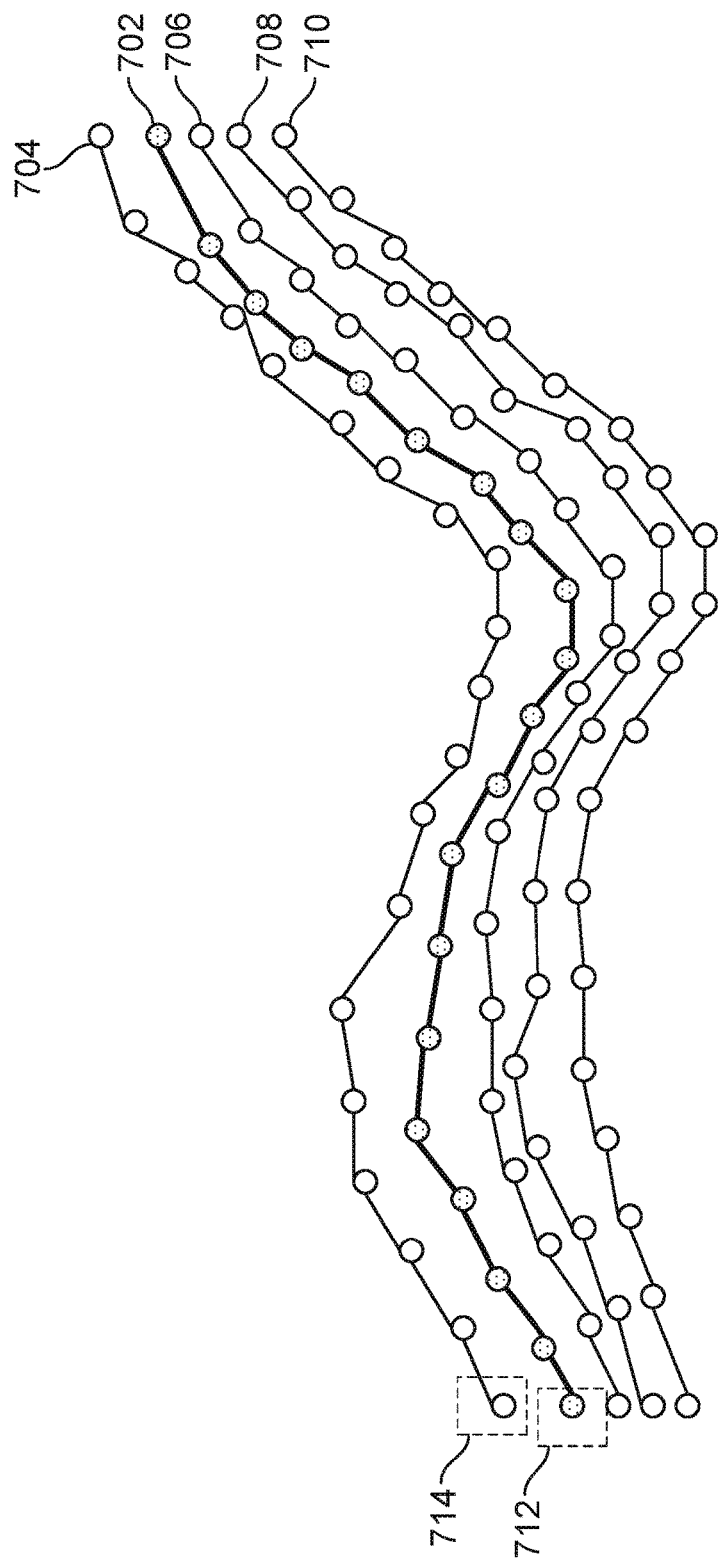
FIG. 7 is a diagram showing an example of visual representations of a segment and efforts that match the segment.

FIG. 7 is a diagram showing an example of visual representations of a segment and efforts that have been determined to match the segment. A segment may be represented by a series of discrete GPS data points. For example, GPS data point 712 is associated with segment 702. For example, segment 702 may have been defined based on the GPS data associated with a particular user's uploaded effort. The user may have recorded an effort and indicated (e.g., via a user interface) a portion of the GPS data associated with the effort to store as segment 702. Each effort also corresponds to a series of discrete GPS data points. For example, GPS data point 714 is associated with effort 704. As shown in the example, the GPS data points of segment 702 are plotted in a two-dimensional space (associated with latitudinal and longitudinal coordinates). The GPS data points of four user uploaded efforts (effort 704, effort 706, effort 708, and effort 710) that have been determined to match segment 702 are also plotted in the same space. If it is assumed that it is determined that a validation process is to begin on segment 702 (e.g., because segment 702 has met a validation criterion), then at least some of the efforts that have been determined to match segment 702 are used to validate segment 702. In the example, all four matching efforts, effort 704, effort 706, effort 708, and effort 710, are used to validate segment 702. Each of effort 704, effort 706, effort 708, and effort 710 may be recorded by the same or different GPS-enabled devices. In some embodiments, only matching efforts that are recorded by a selected type of GPS-enabled device are used to validate the segment (e.g., because the selected type of GPS-enabled device is determined to be relatively more accurate).

For example, segment 702 may have been defined based on user Steve's uploaded effort associated with a bike ride. Steve may have recorded the bike ride and indicated (e.g., via a user interface) a portion of the geography covered by the bike ride to store as segment 702. For example, Steve may input the identifier of "Montalvo hill climb" for segment 702 to denote the name of the popular climb that he biked over and the geographical track that segment 702 is intended to represent. Over time, other users have recorded various efforts that have been determined to match segment 702 and such efforts include at least effort 704, effort 706, effort 708, and effort 710.

Figure 8:
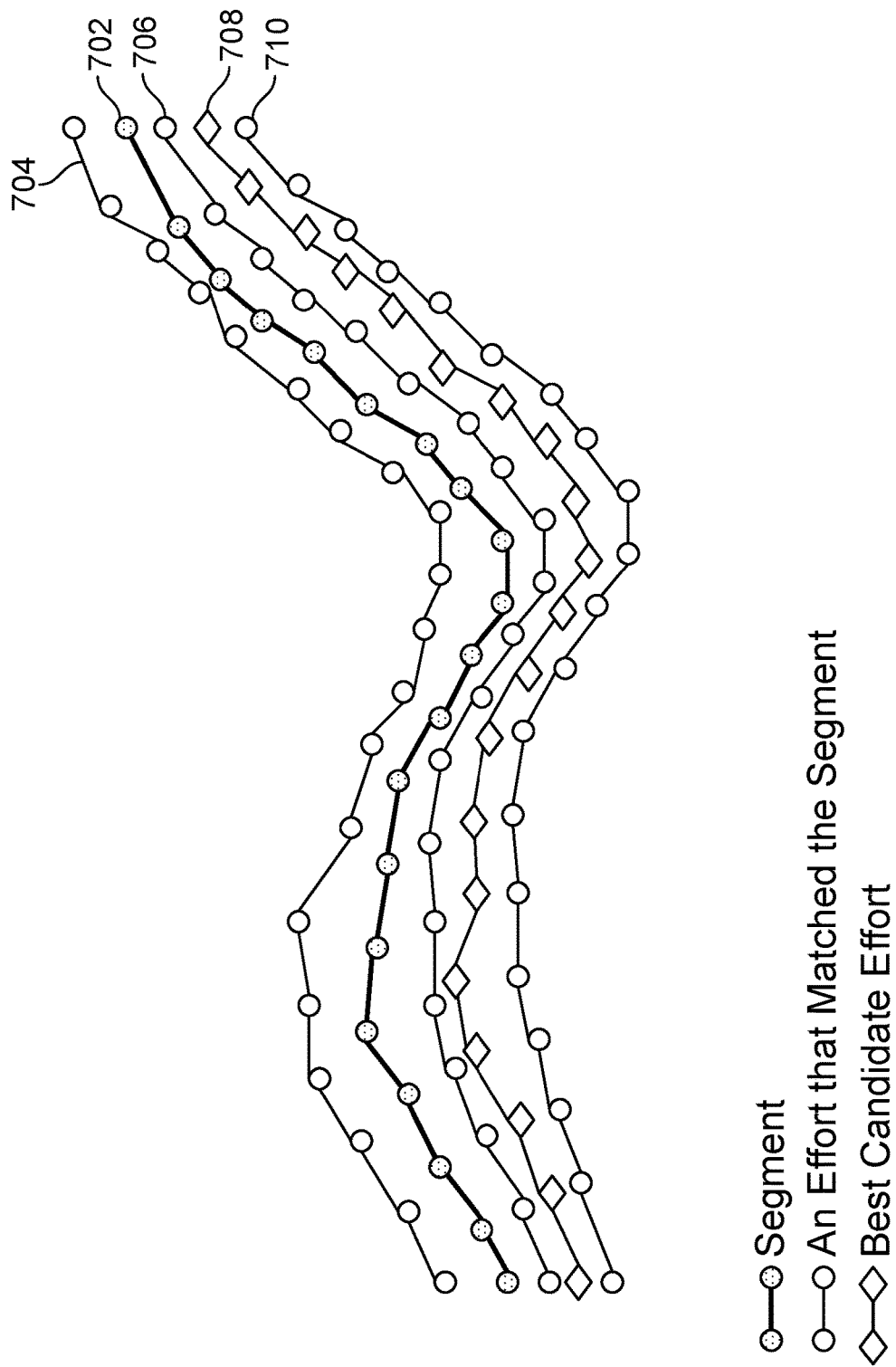
FIG. 8 is a diagram showing an example of selecting a best candidate effort.

FIG. 8 is a diagram showing an example of selecting a best candidate effort. Continuing the example of FIG. 7, in FIG. 8, one of the matching efforts (candidate efforts) is identified as the best candidate effort. For example, an effort may be identified as the best candidate effort as a result of determining that the effort is associated with the highest sum of the counts of GPS data points in the vicinity of each of its GPS data points. The best candidate effort is to serve as a reference effort to use in determining the validated segment (i.e., the new version of segment 702). In the example, effort 708 is determined to be the best candidate effort.

Figure 9:
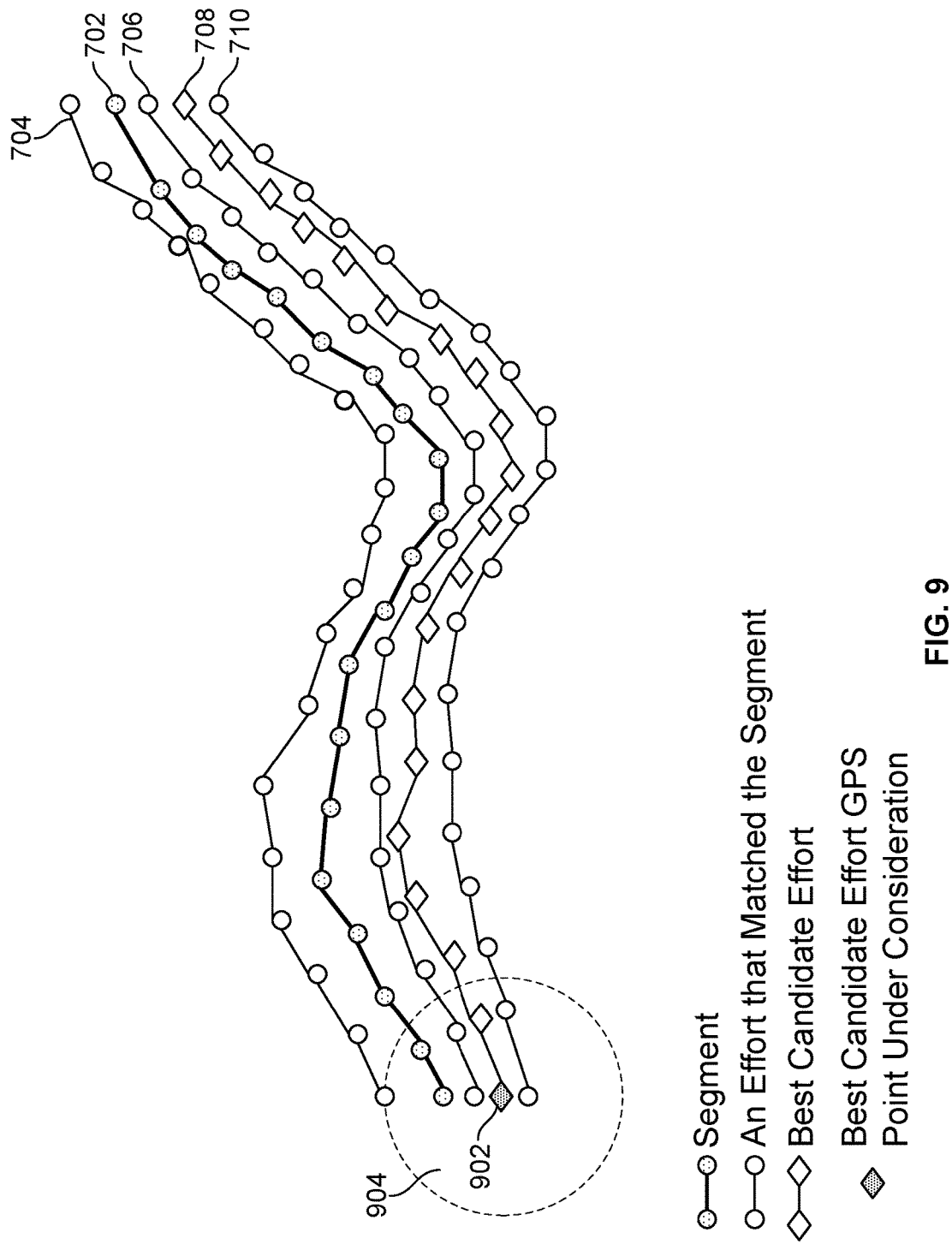
FIG. 9 is a diagram showing the determination of a centroid based on a GPS data point of the best candidate effort.

FIG. 9 is a diagram showing the determination of a centroid based on a GPS data point of the best candidate effort. As described above, each GPS data point of the best candidate effort may be used to form the center of a circular area (e.g., of a predetermined radius) for which at least a subset of GPS data points associated with the other considered matching efforts (and in some embodiments, the original segment, segment 702) enclosed in the circular area is used to determine a centroid. The centroid is associated with its own set of Lat-Lng coordinates. In some embodiments, a centroid determination function may be applied a predetermined number of times (e.g., four) on the GPS data points included in the circular area centered on the current GPS data point of the best candidate effort for such GPS data points to converge into a centroid. In the example, GPS data point 902 of the best candidate effort, effort 708, is the current GPS data point around which the circular area 904 is drawn. The GPS data points of the other efforts (effort 704, effort 706, and effort 710) that are included in circular area 904 are used to compute a centroid.

Figure 10:
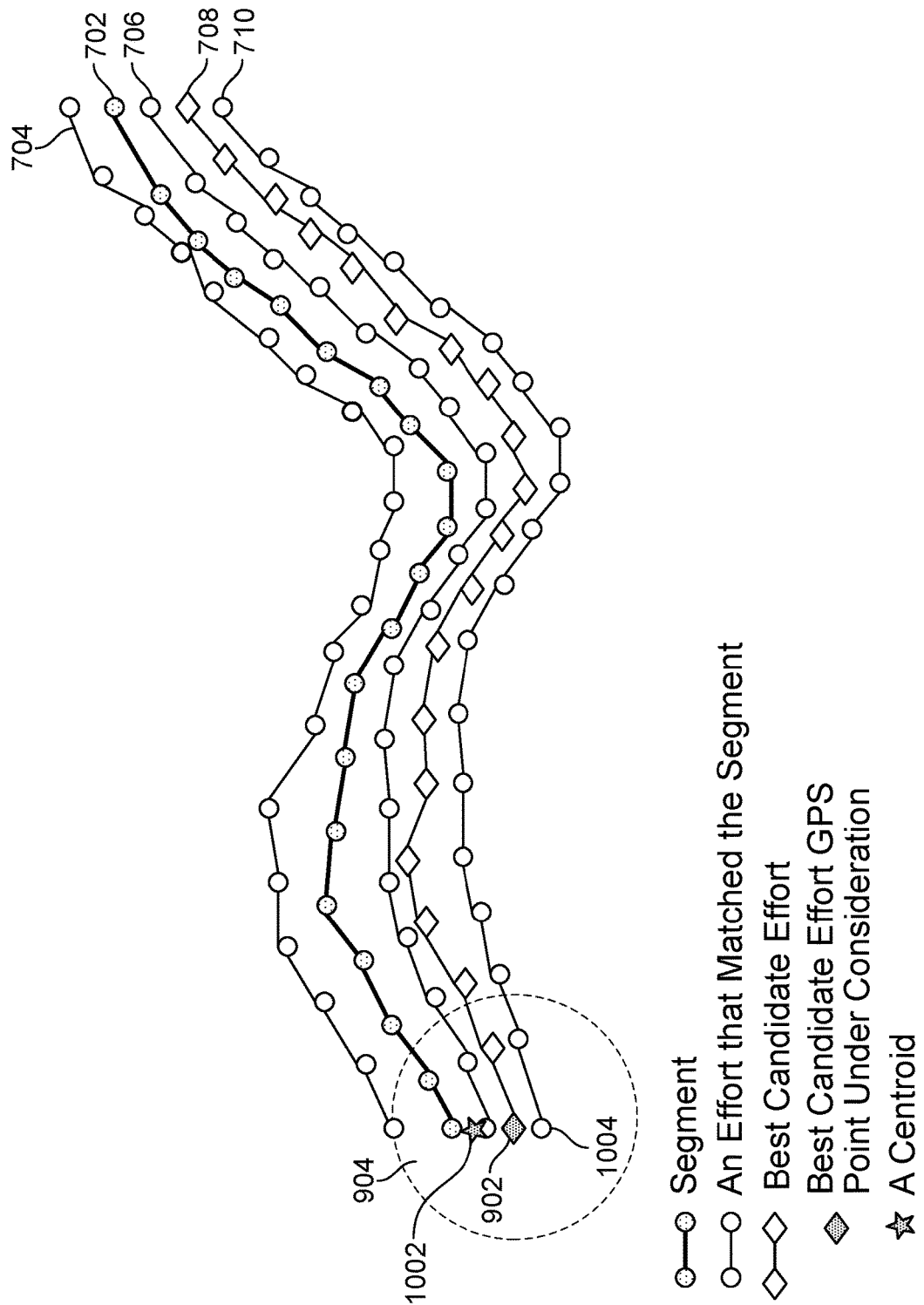
FIG. 10 is a diagram showing a centroid determined based on a GPS data point of the best candidate effort.

FIG. 10 is a diagram showing a centroid determined based on a GPS data point of the best candidate effort. Continuing the example of FIG. 9, in FIG. 10, centroid 1002 is computed based on at least a subset of the GPS data points of the other efforts (effort 704, effort 706, and effort 710) that are included in circular area 904. Each subsequent GPS data point of the best candidate effort can be similarly used to determine a corresponding centroid.

In some embodiments, in determining the centroid associated with the first GPS data point of the best candidate effort, such as GPS data point 902 of the best candidate effort in the example, only the first data point of each of the other candidate efforts (e.g., such as GPS data point 1004 of effort 710) are considered so that the centroid will fall along the same start plane as the original segment, segment 702. Making sure that the centroid falls along the same start and end planes as the segment before the validation will help preserve the length of the segment.

Figure 11:
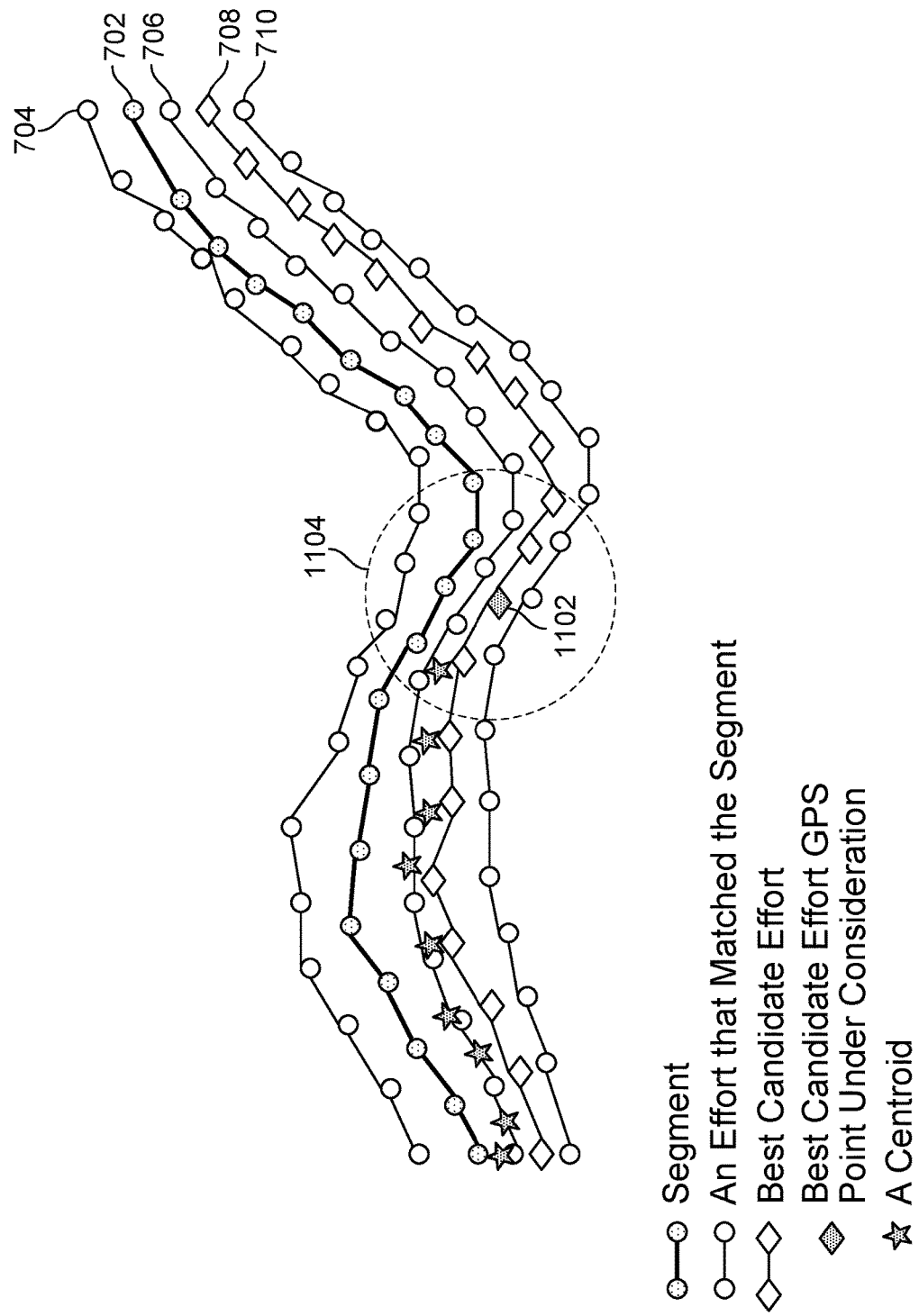
FIG. 11 is a diagram showing various centroids determined based on corresponding GPS data points of the best candidate effort.

FIG. 11 is a diagram showing various centroids determined based on corresponding GPS data points of the best candidate effort. Continuing the example of FIG. 10, in FIG. 11, subsequent GPS data points in the best candidate effort are walked along and used to determine a corresponding centroid. In the example, a centroid corresponding to GPS data point 1102 of the best candidate effort is currently being determined using at least circular area 1104.

Figure 12:
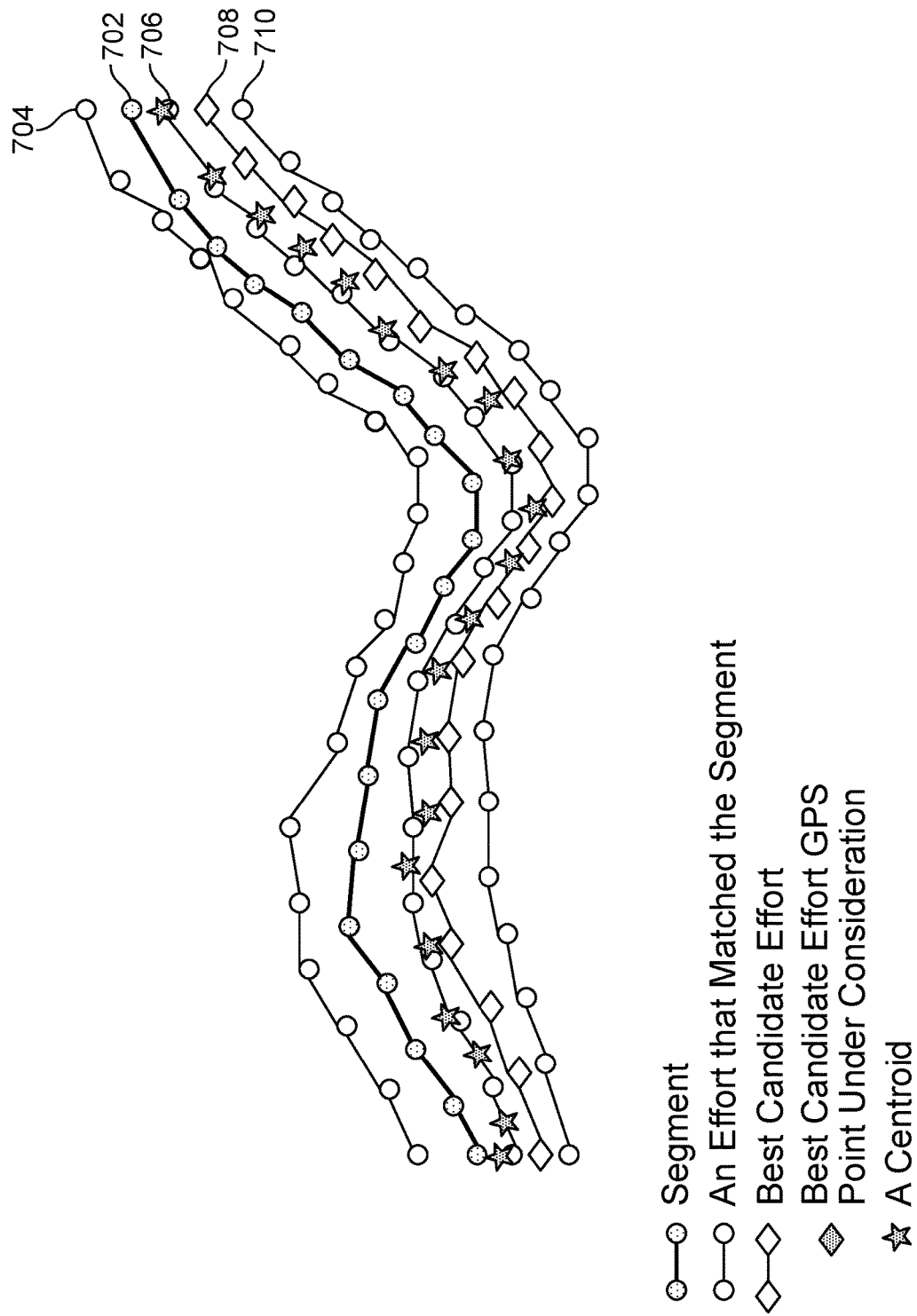
FIG. 12 is a diagram showing determined centroids corresponding to all the GPS data points of the best candidate effort.

FIG. 12 is a diagram showing determined centroids corresponding to all the GPS data points of the best candidate effort. Continuing the example of FIG. 11, FIG. 12 shows corresponding centroids having been determined for each GPS data point of the best candidate effort. In some embodiments, in determining the centroid associated with the last GPS data point of the best candidate effort, only the last GPS data point of each of the other matching efforts are considered so that the centroid will fall along the same end plane as the original segment, segment 702.

Figure 13:
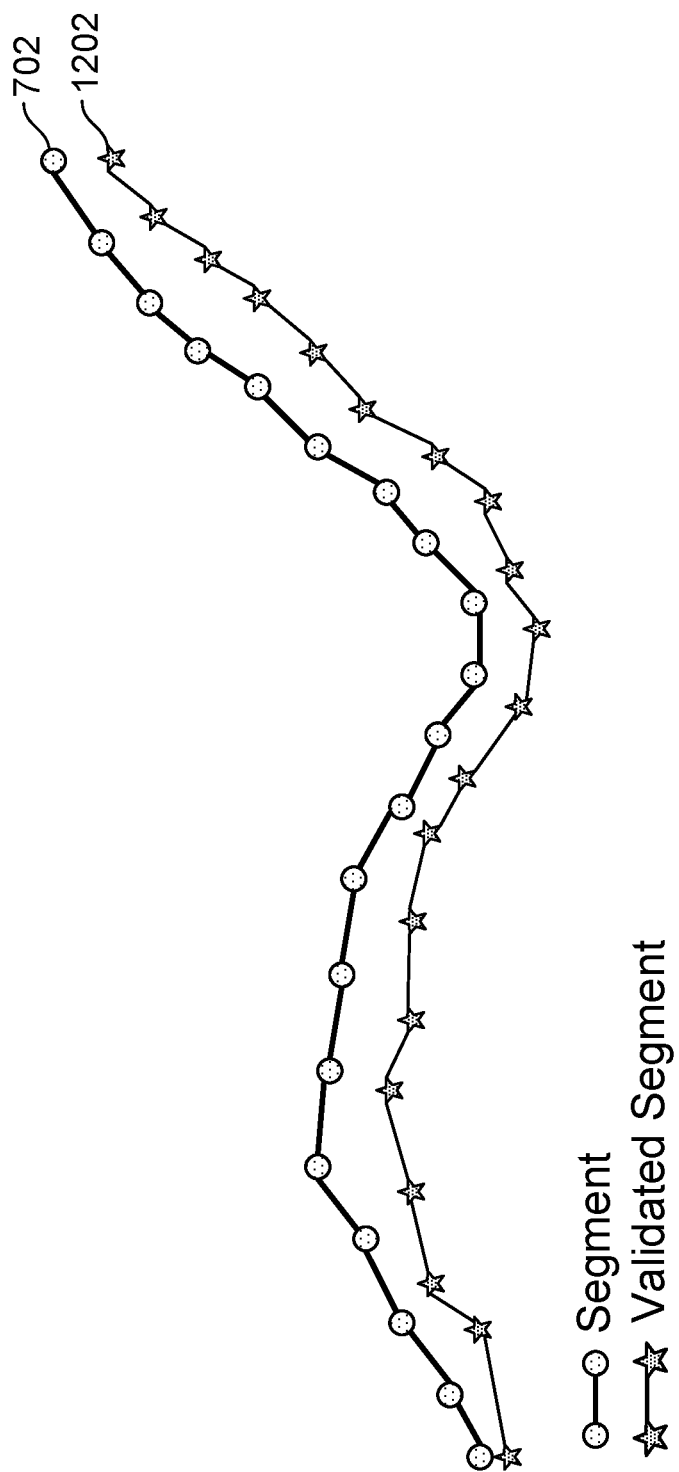
FIG. 13 is a diagram showing a validated segment determined based on the determined centroids.

FIG. 13 is a diagram showing a validated segment determined based on the determined centroids. Continuing the example of FIG. 12, FIG. 13 shows all the determined centroids corresponding to each GPS data point of the best candidate effort. Such centroids can be stored to represent the validated segment, segment 1202, which is the new version of the segment that was validated, segment 702. In some embodiments, segment 1202 may be stored with at least some of the metadata that was previously associated with segment 1202 (e.g., the identifier of "Montalvo hill climb") such that segment 1202 can replace segment 702. Existing and new efforts can be compared to segment 1202 to determine matching efforts.

Another example of generating a validated segment, which is not shown, includes finding an average of all the GPS data points included in each circular area centered on each GPS data point of the best candidate effort. Yet another example of generating a validating segment, which is not shown, includes inputting the GPS data associated with the segment to be validated and the matching efforts in a GIS program. The GPS data can be converted into a raster image. Different colors may be applied to areas of the raster image with different densities. For example, the areas with the highest densities may be colored in white. The white portions of the raster image may be connected to form the validated segment.

Embodiments of repairing recorded GPS data are described herein. In some embodiments, recorded GPS data may include the GPS data associated with efforts. In some embodiments, recorded GPS data may include the GPS data associated with segments. As mentioned above, several types of errors may corrupt recorded GPS data. Examples of sources of GPS data recording errors include the GPS-enabled device losing connection with one or more satellites that it needs to accurately track Lat-Lng Data, the GPS-enabled device measuring data too infrequently, and the GPS-enabled device having a limited degree of accuracy such that it misinterprets Lat-Lng Data. As such, because efforts are recorded with GPS-enabled devices, efforts may include inaccurate GPS data. Furthermore, in some embodiments, a segment may be defined based on the set of GPS data associated with an effort and may therefore inherit the inaccurate GPS data that was associated with the effort.

As will be described in more detail below, a first type of GPS data related error in an effort is associated with one or more stuck (or "sticky") GPS data points that occur when the GPS-enabled device cannot determine its new location compared to the immediately previous location and subsequently re-records the same location at successive GPS data points, stacking them on top of each other. A second type of GPS data related error in an effort includes a drift in at least some of the GPS data points (e.g., from plausible locations that the GPS data points should have been).

It would be desirable to correct at least some error in the GPS data associated with an effort so that the effort will more likely be determined to match the segment(s) that it should match. Furthermore, it would be desirable to correct error in the GPS data associated with an effort so that the corrected efforts may be used to more accurately determine "best performance portions," which include determining at least a portion of an effort associated with a predetermined distance that is associated with the user's best performance based on a particular measurement (e.g., speed) as compared with the rest of the effort. It would be desirable to correct error in the GPS data associated with a segment so that more efforts that should match the segment will more likely be determined to match the segment. Additionally, it would be desirable to correct the GPS data associated with the segment so that the segment may better reflect the actual geographical track that it was defined to represent.

In various embodiments, recorded GPS data is determined based on a repaired base map. In some embodiments, the repaired base map is created with one or more different data sources and is used to represent accurate GPS data that efforts and/or segments are to be changed, at least in part, to reflect.

Figure 14:
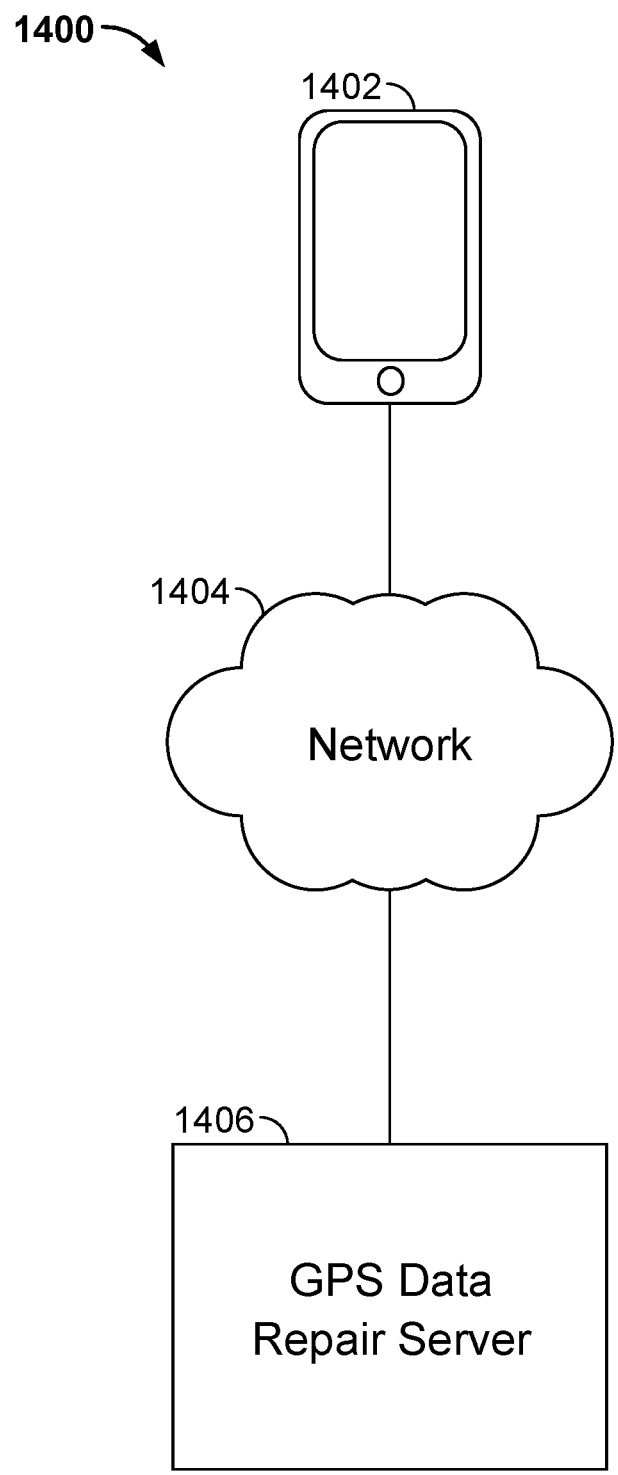
FIG. 14 is a diagram showing an embodiment of a system for repairing GPS data.

FIG. 14 is a diagram showing an embodiment of a system for repairing GPS data. In the example, system 1400 includes device 1402, network 1404, and GPS data repair server 1406. Network 1404 may include high-speed data networks and/or telecommunications networks. Device 1402 may communicate with GPS data repair server 1406 over network 1404.

Device 1402 is a device that can record GPS data and/or other data associated with a physical activity. Device 1402 can also be a device to which GPS data and/or other data associated with a physical activity can be uploaded or transferred. Examples of device 1402 include, but is not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800), a mobile phone, such as a smart phone (e.g., an Android®-based device or Apple iPhone® device) including a GPS recording application (e.g., MotionX®, Endomondo®, and RunKeeper®, a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 1402 (or an application thereof) is configured to record GPS data and auxiliary data associated with a physical activity during the activity. As described above, a set of GPS data and auxiliary data may be referred to as an effort. For example, auxiliary data associated with a physical activity may include physiological, environmental, and/or performance data. In some embodiments, device 1402 is configured to receive recorded GPS data and auxiliary data associated with a physical activity subsequent to the completion of the activity (e.g., such information is uploaded to device 1402).

Similarly as described for system 100 of FIG. 1, a segment may be defined based on the GPS data associated with an effort (e.g., using a user interface). Segments and efforts may be stored at GPS data repair server 1406. GPS data repair server 1406 is configured to create a repaired base map using GPS data aggregated from one or more sources. GPS data repair server 1406 is further configured to repair an effort using the repaired base map. In some embodiments, GPS data repair server 1406 is configured to identify a particular type of error associated with an effort and repair the effort based on the identified type of error and the repaired base map. In some embodiments, GPS data repair server 1406 is configured to determine a best performance portion of a repaired effort. In some embodiments, GPS data repair server 1406 is also configured to repair a segment using the repaired base map. In some embodiments, GPS data repair server 1406 is configured to determine whether a repaired effort matches one or more segments, including the repaired segments.

Performance data may be more accurately determined from a repaired effort and the repaired effort will more likely be determined to match a segment so that comparisons against other efforts that match the same segment may be performed. Furthermore, a repaired segment may better represent the actual geography of the track that it is intended to represent.

Figure 15:
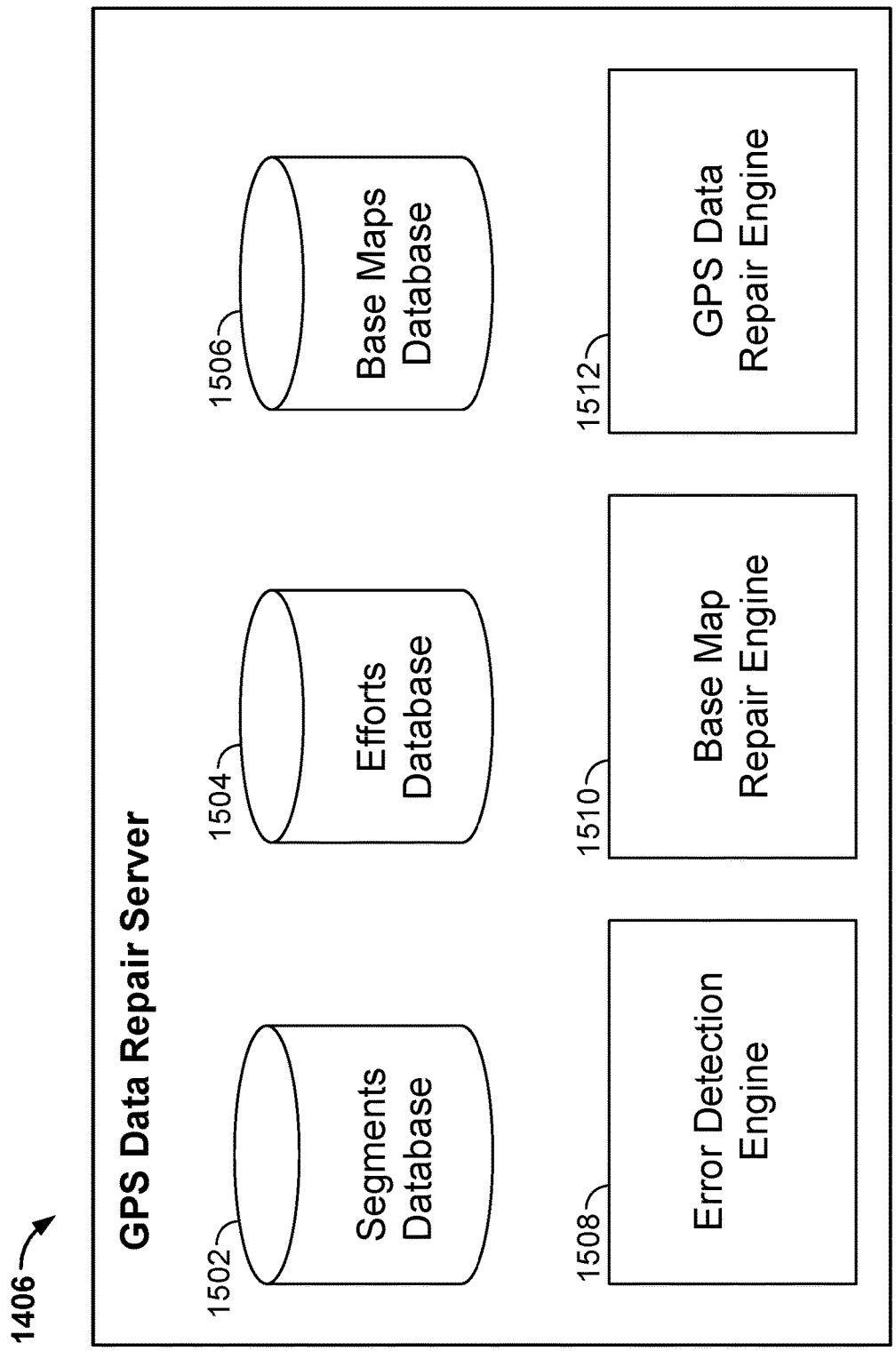
FIG. 15 is a diagram showing an example of a GPS data repair server.

FIG. 15 is a diagram showing an example of a GPS data repair server. In some embodiments, GPS data repair server 1406 of system 1400 of FIG. 14 is implemented using the example of FIG. 15. In some embodiments, a GPS data repair server may include more or fewer components than what is shown in the example of FIG. 15. The shown example of the GPS data repair server includes segments database 1502, efforts database 1504, base maps database 1506, error detection engine 1508, base map repair engine 1510, and GPS data repair engine 1512. Each of segments database 1502 and efforts database 1504 may be implemented using one or more databases. Each of error detection engine 1508, base map repair engine 1510, and GPS data repair engine 1512 may be implemented using one or both of hardware and software.

Segments database 1502 is configured to store segments. In some embodiments, segments database 1502 may be implemented using segments database 202 of the example of the segment validation server of FIG. 2. In some embodiments, a segment stored at segments database 1502 may be repaired by GPS data repair engine 1512. In some embodiments, the repaired version of the segment is used to replace the previous version of the segment at segments database 1502, regardless of whether the previous version of the segment has been validated or not. In some embodiments, the repaired segment is stored with at least some of the same metadata that was stored with the previous version of the segment. In some embodiments, the repaired segment is stored with a version number associated with the number of times that the segment has been repaired by GPS data repair engine 1512.

Efforts database 1504 is configured to store efforts. In some embodiments, efforts database 1504 may be implemented using efforts database 204 of the example of segment validation server of FIG. 2. In some embodiments, an effort stored at efforts database 1504 may be repaired by GPS data repair engine 1512. In some embodiments, the repaired version of the effort is used to replace the previous version of the effort at efforts database 1504. In some embodiments, the repaired effort is stored with at least some of the same metadata that was stored with the previous version of the effort.

Base maps database 1506 is configured to store GPS data from one or more sources. Base maps database 1506 is also configured to store repaired base maps. For example, a repaired base map comprises a geographic information system (GIS) base layer. In various embodiments, a repaired base map is configured to represent an accurate map that may serve as a reference that at least portions of other GPS data (e.g., associated with efforts and/or segments) may be repaired/corrected to reflect. For example, a repaired base map includes paths, roads, routes, and/or trails that are known and assumed to be accurate (by virtue of the repair). In some embodiments, base maps database 1506 is configured to store GIS base maps from one or more third party sources (e.g., Topologically Integrated Geographic Encoding and Referencing (TIGER) or Open Street Map). For example, a base map may include streets, highways, boundaries for census, postal, political areas, rivers, lakes, parks, landmarks, place names, and U.S. geological survey (USGS) raster maps. In some embodiments, base maps database 1506 is configured to store crowd sourced attributes associated with paths/routes that may be used to modify portions of a generated repaired base map or the repaired base map's metadata. For example, crowd sourced attributes may indicate that a certain road is a "dirt road," which could be stored as metadata associated with the road. Also for example, crowd sourced attributes may also indicate unnecessary data (for the purpose of GPS data correction) in the repaired base map such as highways, ferry routes, and roads that are not typically used for physical activities associated with efforts.

In some embodiments, base maps database 1506 is configured to store GPS data associated with user uploaded GPS data, such as the GPS data associated with efforts. In some embodiments, the user uploaded GPS data is associated with only matching efforts (i.e., efforts that have been determined to match at least one segment).

In some embodiments, base maps database 1506 is configured to store GPS data associated with segments that have been validated, as described above. In some embodiments, base maps database 1506 is configured to not redundantly store user uploaded GPS data, such as efforts and/or segments that are already stored and are accessible at efforts database 1504 and segments database 1502.

In some embodiments, base maps database 1506 is configured to store repaired base maps. In some embodiments, base maps database 1506 is configured to store a repaired base map that is generated by base map repair engine 1510. In some embodiments, a repaired base map is generated based on the GPS data aggregated from one or more sources. For example, the third party source GPS data, user uploaded GPS data (e.g., associated with matching efforts), and/or GPS data associated with validated segments may be used to determine a repaired base map. In some embodiments, base maps database 1506 is configured to store different versions of a repaired base map. For example, as more and more updated GPS data is received over time, updated repaired base maps may be generated and stored by base maps database 1506 with associated metadata that indicate their associated versions. Furthermore, each repaired base map stored by base maps database 1506 may be associated with a particular type of physical activity. Examples of types of physical activity include running and biking. For example, using crowd sourced attributes, for example, it can be determined that certain paths on a map are often used by runners but not by cyclists and vice versa, and so a repaired base map that is optimized for runners (e.g., the repaired base map can be generated based on user uploaded GPS data associated with running) is stored with metadata indicating such so that it may be used later to appropriately correct an effort associated with running.

Error detection engine 1508 is configured to detect error associated with efforts and segments. In some embodiments, error detection engine 1508 is configured to detect a type of error associated with an effort. For example, types of errors associated with an effort include the effort having one or more stuck or sticky GPS data points and the effort having one or more drifted GPS data points. For example, error detection engine 1508 may be configured to determine that an effort includes one or more stuck or sticky GPS data points when speed and acceleration of a portion of an effort is very low, or zero, followed by the leapfrog effect when the GPS-enabled device re-acquires a good location—spanning the entire distance covered while all the stuck points were recorded only in the timespan of the last two recorded points. For example, error detection engine 1508 may be configured to determine that an effort includes one or more drifted GPS data points based on receiving a user selection that the recorded effort shows a clear drift from the road or path based on a user's manual inspection of a visual representation of the effort on a map. Also for example, error detection engine 1508 may be configured to determine that an effort includes one or more drifted GPS data points based on detecting any GPS data points of the effort that do not fall within corridors of known roads or trails that are included in the repaired base map—such GPS data points will be considered to have drifted (unless it is determined that there is enough crowd sourced attributes to determine that a road or trail actually is there—in which the road or trail will be automatically recognized and digitized into the repaired base map).

In some embodiments, error detection engine 1508 may be configured to determine an effort that should have matched a segment but did not based on automatically determining that if the effort went from point A to point B, then it must have covered a segment that is associated with points A and B. Additionally, error detection engine 1508 may be configured to determine an effort that should have matched a segment but did not based on receiving a user selection that the user associated with the effort knowingly traversed a segment but the effort did not match the segment. Furthermore, in some embodiments, error detection engine 1508 is configured to detect for an effort that the GPS-enabled device stopped recording a physical activity because of bad signal quality.

In some embodiments, error detection engine 1508 is configured to detect a segment with low quality matches. For example, an effort may be determined to match a segment if it is determined that the GPS data associated with the effort meets or exceeds a predetermined match (e.g., similarity) threshold with the GPS data of the segment. An effort that is associated with GPS data that just barely meets the predetermined match threshold with the GPS data of a segment may be considered to be a low quality match. For example, an effort that is considered to be a low quality match may be an effort that just meets or exceeds the predetermined match threshold within a configured range that is above the predetermined match threshold. For example, if the predetermined match threshold is 80% and an effort is determined to have a percentage of match of 82% with the segment and the configured range of low quality match is 0% to 5% above the threshold, then the effort is determined to be a matching effort to that segment (i.e., data indicating a matching relationship between the effort and the segment is to be stored) but the effort is considered to be a low quality match because its percentage of match with the segment is within the configured range of low quality match above the predetermined match threshold. If it appears that several efforts that are determined to match a segment each matches with a low quality of match, then the scenario could indicate that the segment should be repaired due to the general poor quality of matches. Therefore, in some embodiments, error detection engine 1508 is configured to detect that a segment is associated with low quality matches if at least a threshold number of efforts that have been determined to match the segment each matches with a low quality of match.

Base map repair engine 1510 is configured to generate repaired base maps. In some embodiments, base map repair engine 1510 is configured to generate a repaired base map using aggregated GPS data from one or more sources. In some embodiments, base map repair engine 1510 is configured to use GPS data aggregated at base maps database 1506. Examples of aggregated GPS data include GPS data from a third party source (e.g., TIGER), GPS data that is uploaded by users, and/or GPS data associated with validated segments. In some embodiments, base map repair engine 1510 is configured to use a base map from a particular source (e.g., TIGER) as an initial base map and repair at least portions of the initial base map using GPS data from other sources (e.g., user uploaded GPS data). For example, unnecessary portions of the initial base map may be removed based on the lack of user uploaded GPS data that covers them. For example, only a subset of the user uploaded data that is recorded by a selected GPS-enabled device (e.g., a device that is known to be relatively more accurate than other devices) may be used to repair the initial base map. In another example, user uploaded data to use to repair a base map may be determined as follows: the body of user uploaded data is mined at a volume corresponding to the sum distance of roads and trails within each area. A county, for example, may have 5,000 kilometers of roads—a specific number of user uploaded GPS data corresponding to that county will be selected to enable repair of that area of the base map. In some embodiments, a weighted average and density corridor threshold technique is used to determine the likely path of a road of trail on the base map using the subset of the user uploaded data. Therefore, portions of the initial base map may be augmented to generate the repaired base map without having to create a base map from scratch. In some embodiments, base map repair engine 1510 is configured to modify a repaired base map using crowd sourced attributes. For example, portions of the base map may be removed as being irrelevant or unnecessary (e.g., for a particular type of physical activity) using crowd sourced attributes associated with paths/routes. Also, for example, new paths or routes may be added to a repaired base map using crowd sourced attributes that confirm their existence.

In some embodiments, base map repair engine 1510 is configured to generate physical activity type-specific repaired base maps. For example, different types of physical activities may entail different types of paths and trails usage on a map. For example, runners often run on paths and trails that cyclists do not use and vice versa. Also, runners tend to run on paths next to roads and cyclists ride on roads. For example, user uploaded GPS data may be physical activity type-specific. As such, base map repair engine 1510 may generate a repaired base map for each type of physical activity by, in some embodiments, repairing an initial base map created by a third party source based on physical activity type-specific data. For example, to generate a repaired base map associated with the physical activity type of running, the initial base map created by a third party source may be repaired using user uploaded GPS data that is specific to running activities. Also, for example, to generate a repaired base map associated with the physical activity type of cycling, the initial base map created by a third party source may be repaired using user uploaded GPS data that is specific to cycling activities.

GPS data repair engine 1512 is configured to repair efforts. In some embodiments, GPS data repair engine 1512 is configured to determine to repair an effort based on the type of error that has been identified for the effort by error detection engine 1508. In some embodiments, GPS data repair engine 1512 is configured to repair an effort based on the type of identified error associated with the effort and a relevant repaired base map from base maps database 1506. For example, if the effort was recorded during a run, then GPS data repair engine 1512 would repair the effort based on a repaired base map associated with running. Examples of repairing efforts associated with different types of errors are described further below.

In some embodiments, GPS data repair engine 1512 is configured to repair segments. In some embodiments, GPS data repair engine 1512 is configured to determine to repair a segment that has been determined by error detection engine 1508 to be associated with low quality matches. In some embodiments, GPS data repair engine 1512 is configured to repair a segment based on a repaired base map. Examples of repairing segments are described further below.

In some embodiments, GPS data repair engine 1512 is configured to determine an end point for an effort that was poorly recorded. In the event that a GPS-enabled device stops recording a physical activity because of bad signal quality, the end point of the effort will need to be accurately interpolated. In the event that an end point is to be interpolated for an effort, in some embodiments, GPS data repair engine 1512 is configured to analyze the known progress of the recorded effort to the point that the GPS-enabled device stopped recording, as well as accounting for the next known recorded point. GPS data repair engine 1512 may determine that the effort matches at least a portion of a segment and given enough data along the segment to which the effort is determined to match, a calculated projected finish time with a percentage accuracy dependent on the amount of data included in the effort can be provided to a user. For example, given enough data along the segment may refer to a certain percentage of the segment that has been matched, which enables an increasingly accurate calculated finish time the more of the segment that is matched before the GPS-enabled device stopped recording.

Figure 16:
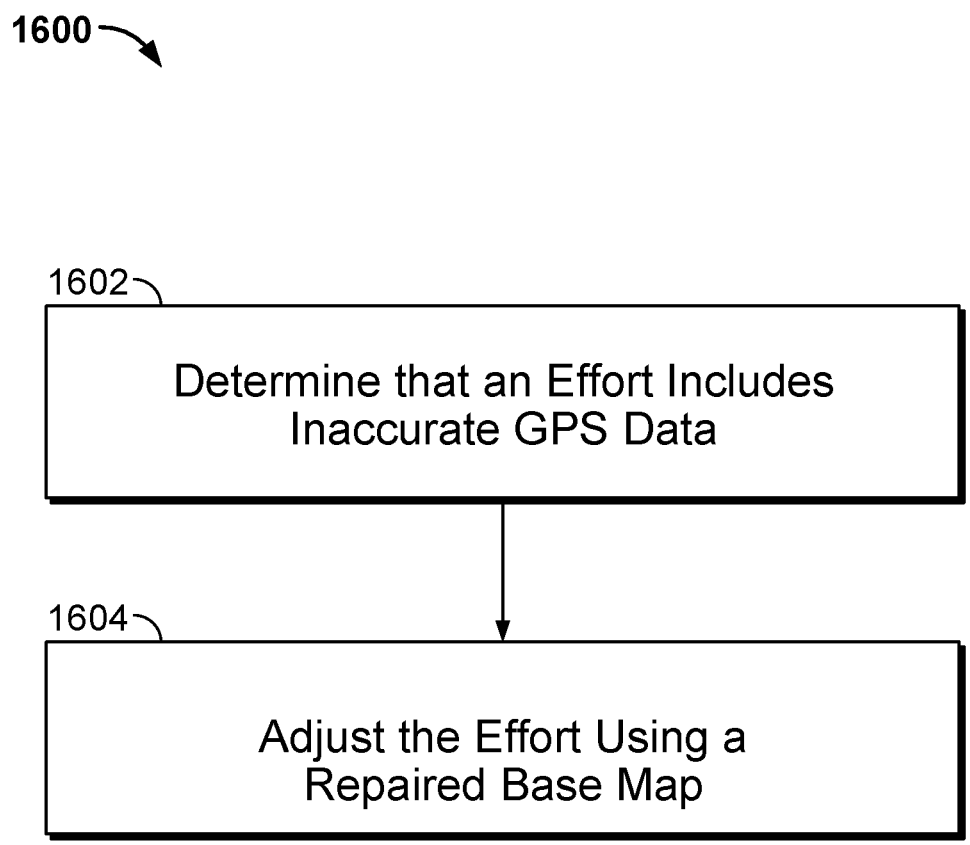
FIG. 16 is a flow diagram showing an embodiment of a process for repairing an effort.

FIG. 16 is a flow diagram showing an embodiment of a process for repairing an effort. In some embodiments, process 1600 is implemented at system 1400 of FIG. 14.

At 1602, it is determined that an effort includes inaccurate GPS data. In some embodiments, an effort that includes inaccurate GPS data is determined by detecting patterns and/or signatures of errors in the effort. For example, different patterns or signatures of errors may be associated with different types of errors. Examples of types of errors include one or more stuck or sticky GPS data points in an effort and one or more drifted GPS data points in an effort.

At 1604, the effort is adjusted using a repaired base map. In some embodiments, adjusting the effort includes modifying or adding at least one or more GPS data points into an effort. In some embodiments, an effort is adjusted based on the type of error that is identified in the effort and corrected using a repaired base map alone or in conjunction with other references. In some embodiments, a repaired base map that is associated with the same type of physical activity that is associated with the effort is used to adjust the effort.

Figure 17:
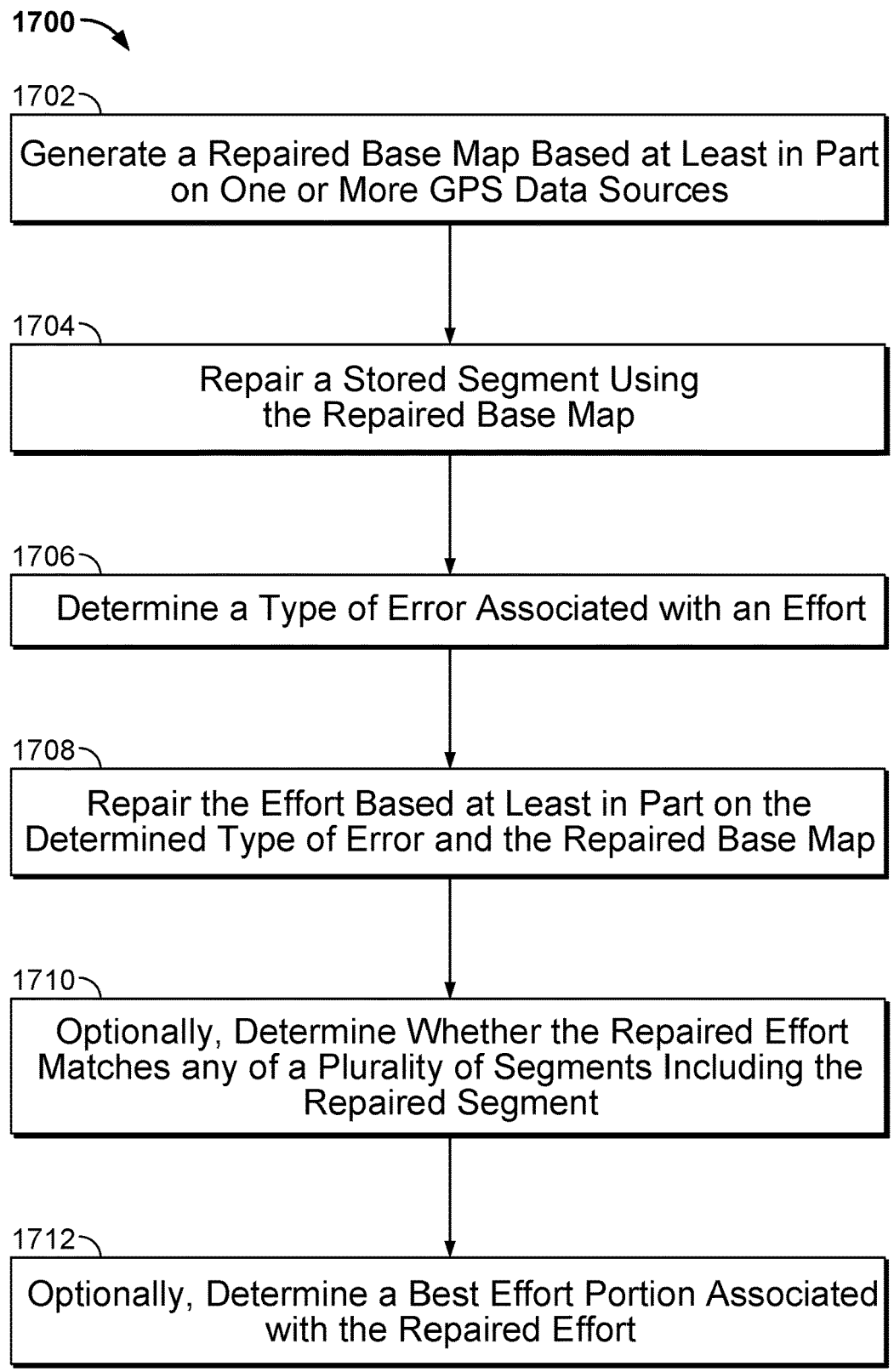
FIG. 17 is a flow diagram showing an embodiment of a process for repairing GPS data.

FIG. 17 is a flow diagram showing an embodiment of a process for repairing GPS data. In some embodiments, process 1700 is performed at system 1400 of FIG. 14.

At 1702, a repaired base map is generated based at least in part on one or more GPS data sources. A repaired base map is determined from GPS data that is aggregated from one or more sources.

At 1704, a stored segment is repaired using the repaired base map. A segment is determined to be repaired using the repaired base map. In some embodiments, the segment has first been determined to be associated with low quality matches prior to being repaired with the repaired base map. In various embodiments, repairing a segment with a repaired base map includes moving at least some of the GPS data points in the set of GPS data associated with the segment or inserting GPS data points into the set of GPS data associated with the segment based on known paths included in the repaired base map. Because the repaired base map is considered to represent accurate GPS data, correction of a segment includes changing the segment to better resemble a known path included in the repaired base map.

At 1706, a type of error associated with an effort is determined.

At 1708, the effort is repaired based at least in part on the determined type of error and the repaired base map. The effort is repaired in a manner that is associated with the determined error. In some embodiments, repair associated with a particular type of error associated with an effort may include removing one or more GPS data points associated with the effort. In some embodiments, the unrepaired effort is replaced by the repaired effort. Repairing the effort also includes using the repaired base map. In various embodiments, repairing an effort with a repaired base map includes moving at least some of the GPS data points in the set of GPS data associated with the effort or inserting new GPS data points into the set of GPS data associated with the effort based on known paths included in the repaired base map. Because the repaired base map is considered to represent accurate GPS data, correction of the effort includes changing the effort to better resemble a known path included in the repaired base map.

At 1710, it is optionally determined whether the repaired effort matches any of a plurality of segments including the repaired segment. The repaired effort is matched against stored segments to determine which of the segments (repaired or not) the repaired effort is determined to match. The repaired effort may match segments that the unrepaired effort did not match or even not match segments that the unrepaired effort did match. Either way, it is assumed that the repaired effort is a more accurate version of the effort and so identifiers of segments that match the repaired effort are stored with the effort.

At 1712, a best performance portion associated with the repaired effort is optionally determined. In various embodiments, a best performance portion refers to a portion associated with a predetermined distance (e.g., 3 kilometers, 1 mile) of an effort that is associated with the user's best performance with respect to at least one measurement (e.g., speed, acceleration). For example, the best performance portion may refer to the user's fastest 1 mile distance along the recorded run. The best performance portion may be thought of as determined by moving a sliding window of the predetermined distance across a user's recorded effort and determining the portion of the effort that is associated with the best performance measurement as the best performance portion (associated with that particular performance measurement). In some embodiments, several best performance portions, each associated with a different performance measurement, may be determined for a repaired effort. A repaired effort is more likely to yield a more accurate determination of a best performance portion because an error in an unrepaired effort may likely interfere with the best performance portion determination and cause the determination to be made inaccurately.

Figure 18:
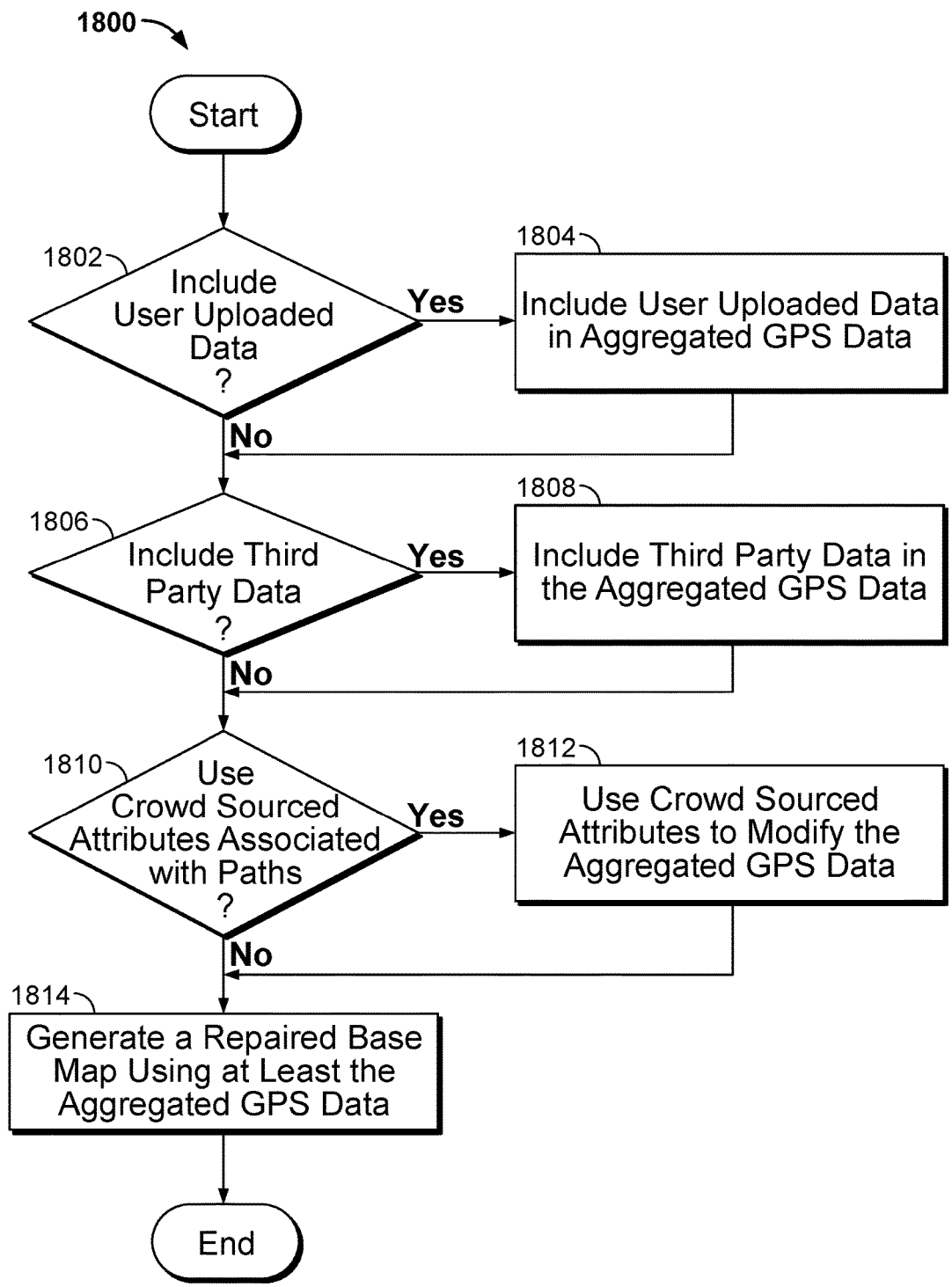
FIG. 18 is a flow diagram showing an embodiment of a process for creating a repaired base map.

FIG. 18 is a flow diagram showing an embodiment of a process for creating a repaired base map. In some embodiments, process 1800 is implemented at system 1400 of FIG. 14. In some embodiments, 1702 of process 1700 of FIG. 17 is implemented using process 1800.

At 1802, it is determined whether user uploaded data is to be included in aggregated GPS data that is to be used to create the repaired base map. For example, user uploaded GPS data includes the GPS data associated with matching efforts. In the event that user uploaded data is determined to be included, control passes to 1804, and user uploaded data is included in the aggregated GPS data. Otherwise, control passes to 1806.

At 1806, it is determined whether third party data is to be included in aggregated GPS data that is to be used to create the repaired base map. For example, third party GPS data includes free data received from a third party source. For example, free data may even include a base map created by a third party. In the event that third party data is determined to be included, control passes to 1808, and third party data is included in the aggregated GPS data. Otherwise, control passes to 1810.

At 1810, it is determined whether crowd sourced attributes associated with paths are to be used to modify the aggregated GPS data. For example, crowd sourced attributes include data received from online forum postings and/or user edited base maps. In the event that crowd sourced attributes are determined to be used, control passes to 1812, and crowd sourced attributes associated with paths are used to modify the aggregated GPS data. Otherwise, control passes to 1814.

At 1814, a repaired base map is generated using at least the aggregated GPS data. For example, if the aggregated GPS data included user uploaded data and third party data that included a third party-created base map, then the third party-created base map be augmented by the user uploaded data and/or the crowd sourced data to create a repaired base map that is to be used to correct segments and/or efforts. Furthermore, in some embodiments, while not shown in the example, GPS data associated with validated segments may also be included in the aggregated GPS data and used to create the repaired base map. In some embodiments, the repaired base map is modified using the crowd sourced attributes associated with paths.

Figure 19:
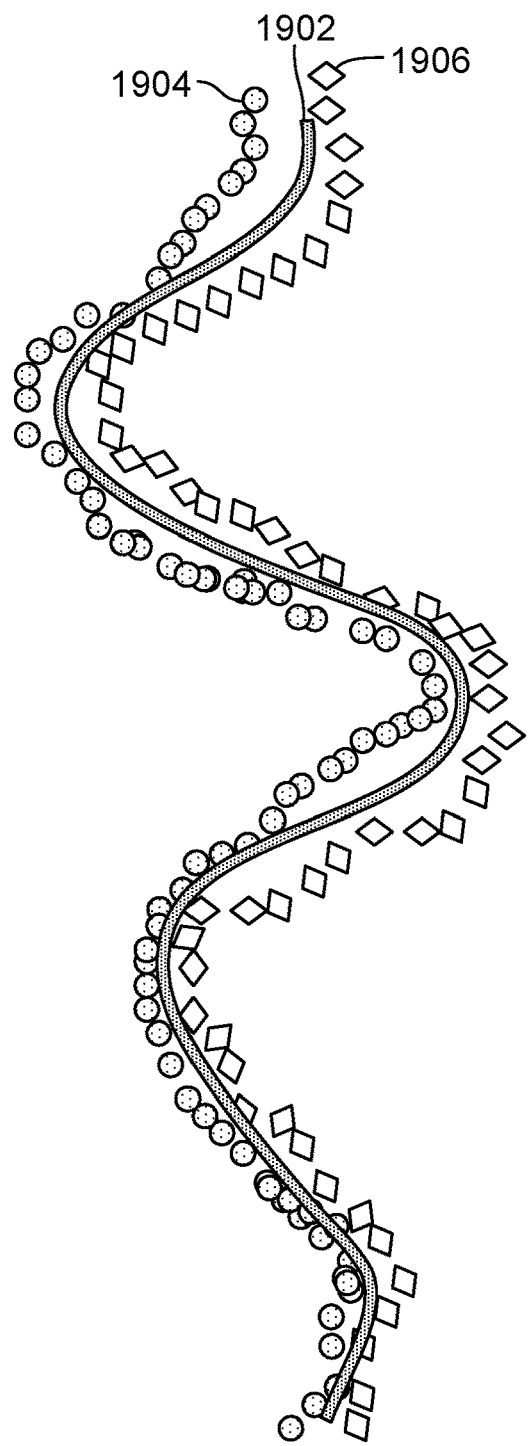
FIG. 19 is a diagram showing an example of generating a portion of a repaired base map.

FIG. 19 is a diagram showing an example of generating a portion of a repaired base map. The example shows a portion of a base map. Assume that the base map is an existing base map associated with free third party data created by TIGER. The portion of the base map that is shown in the example is associated with a particular road. The outline of the road that is represented by TIGER data is represented by road 1906. User uploaded data that is associated with the same road is also included in the diagram as road 1904 and is to be used to correct the TIGER data to generate the repaired data. For example, the user uploaded data may include or be derived from the GPS data of one or more efforts along the geographic track of the road. To repair the road in the example, the road indicated by TIGER data, road 1906, is corrected using the road indicated by user uploaded data, road 1904, which results in repaired road 1902. Road 1902 and other similarly repaired roads will appear in the repaired base map. For example, repaired road 1902 may be computed based on determining weighted averages for the road based on the user uploaded data (road 1904) to use to correct road 1906 that was included in the existing base map to yield repaired road 1902. In some embodiments, the base map may be associated with a particular physical activity and the user uploaded data that is used to correct the roads in the base map is associated with the same physical activity.

In some embodiments, a road such as the road depicted in FIG. 19 may be repaired using a process similar to process 600 of FIG. 6. The only differences are that a piece of road geometry of a base map to be repaired is identified instead of a segment, and rather than finding matching efforts as candidates, user uploaded data for each county are used as the candidates. As such, a repaired road may comprise a new version of the road that is determined based on a set of candidate user uploaded data associated with the county in which the road is located.

Figure 20:
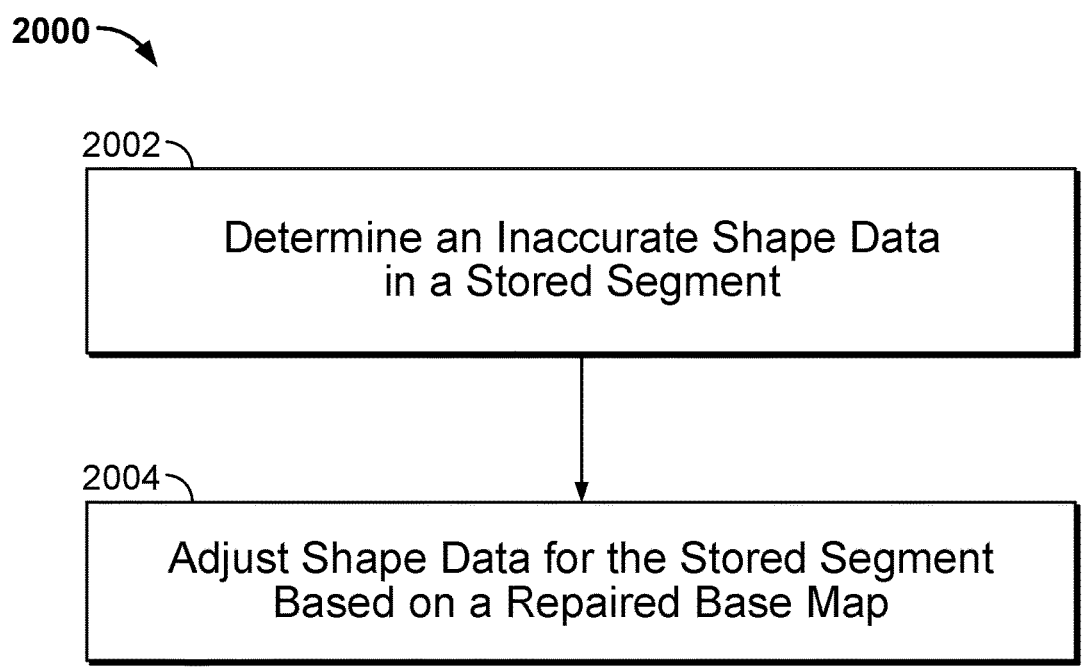
FIG. 20 is a flow diagram showing an embodiment of a process for repairing a segment.

In various embodiments, segments are repaired to yield segments that more accurately represent real-world geographic tracks, paths, or roads. In some embodiments, a segment to be repaired may or may not have been previously validated based on matching efforts. Repaired segments may likely match more efforts at higher quality matches and provide an accurate reference against which multiple efforts that matched the same segment may be compared to each other. FIG. 20 describes one embodiment of repairing a segment.

FIG. 20 is a flow diagram showing an embodiment of a process for repairing a segment. In some embodiments, process 2000 is implemented at system 1400 of FIG. 14. In some embodiments, 1704 of process 1700 of FIG. 17 is implemented using process 2000.

At 2002, an inaccurate shape data in a stored segment is determined. In some embodiments, a stored segment is determined to have an inaccurate shape data if at least a threshold number of efforts that match the segment each matches with a low quality match. If a threshold number of efforts that match the segment each matches with a low quality match, then the segment is determined to likely include significant error and could benefit from error correction.

At 2004, shape data for the stored segment is adjusted based on a repaired base map. In some embodiments, adjusting the shape data (e.g., the set of GPS data) associated with the stored segment based on a repaired base map includes changing the location of some of the GPS data points associated with the stored segment based on known paths or roads included in the repaired base map.

Figure 21:
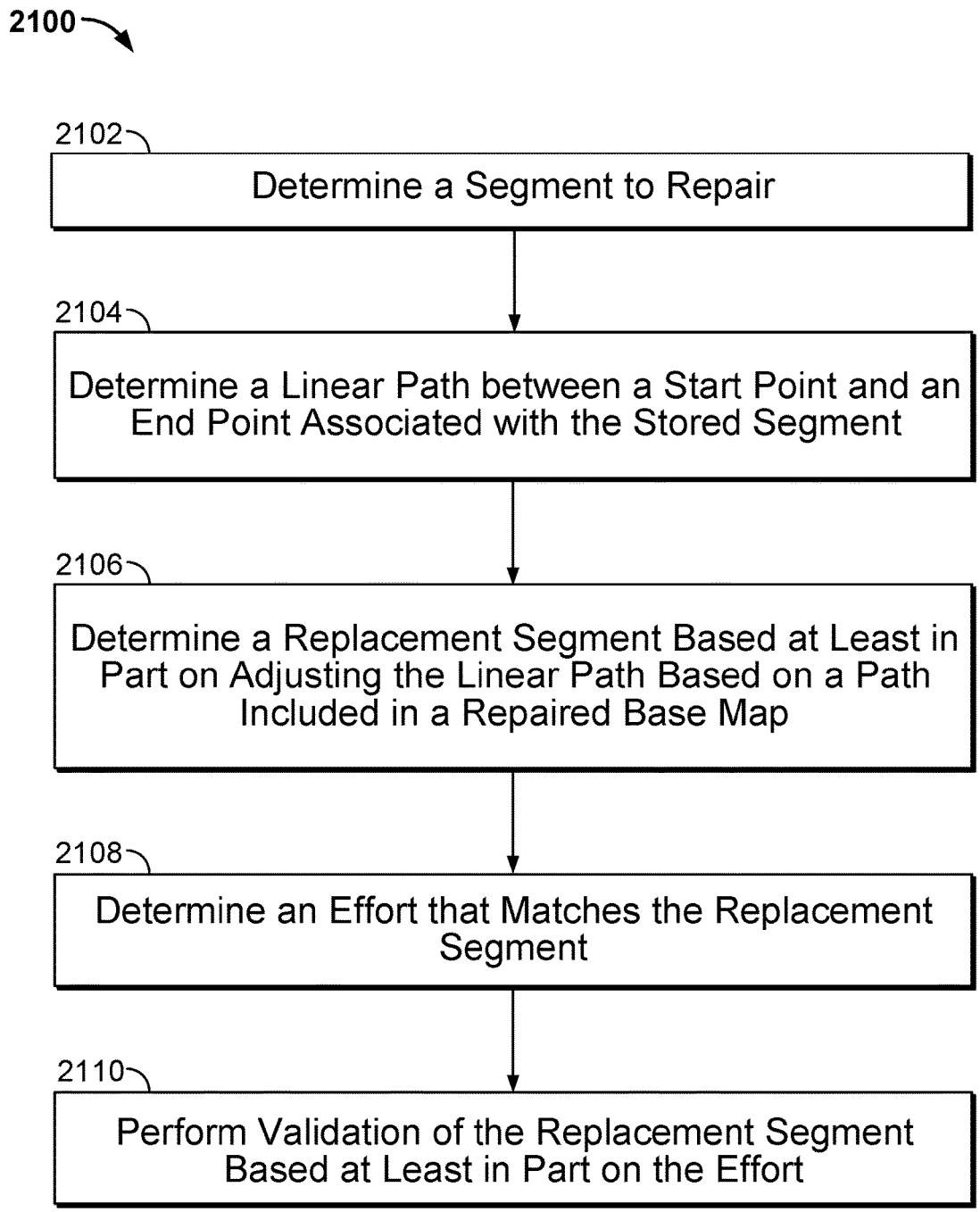
FIG. 21 is a flow diagram showing an embodiment of a process for repairing a segment.

FIG. 21 is a flow diagram showing an embodiment of a process for repairing a segment. In some embodiments, process 2100 is implemented at system 1400 of FIG. 14. In some embodiments, process 2100 is used to implement process 2000 of FIG. 20.

At 2102, a segment to repair is determined. For example, the segment is determined to be repaired if at least a threshold number of efforts that match the segment each matches with a low quality match.

At 2104, a linear path between a start point and an end point associated with the stored segment is determined. Each segment includes a start point and an end point. In some embodiments, the start point of the segment coincides with the first GPS data point that was selected to be associated with the segment and the end point of the segment coincides with the last GPS data point that was selected to be associated with the segment. In some embodiments, the original series of GPS data points in between the start point and the end point is removed and replaced with a linear path. In some embodiments, the linear path comprises a series of discrete GPS data points.

At 2106, a replacement segment is determined based at least in part on adjusting the linear path based on a path included in a repaired base map. In some embodiments, a path included in a repaired base map that is closest to the linear path is determined. Then the location of each of the GPS data points associated with the linear path is moved to a closest location along the determined closest path of the repaired base map. Moving a GPS data point of the linear path to a location of the repaired base map path may be thought of as "snapping" the GPS data point onto the path. Snapping is also to be performed in sequence, such that the repaired segments continue in a forward motion around a hairpin turn, for example, and not necessarily snapped to the closest path, as it might be the wrong side of the hairpin. This means that there is a distinction between the closest point along a road or path and the closest likely point which continues the forward motion of the segment. The shape resulting from adjusting the linear path forms the replacement segment. In some embodiments, the replacement segment is to replace the previous version of the segment. In some embodiments, the replacement segment is stored with at least some of the metadata that was stored with the previous version of the segment.

At 2108, an effort that matches the replacement segment is determined. Stored efforts are compared against the replacement segment to determine whether any of them match the replacement segment. More or different efforts may match the replacement segment than those that matched the previous version of the segment.

At 2110, validation is performed on the replacement segment based at least in part on the effort. In some embodiments, the replacement segment may be validated based on the matching efforts such as in a process 600 of FIG. 6.

FIGS. 22A through 22F show examples of repairing a segment using process 2100 of FIG. 21.

Figure 22A:
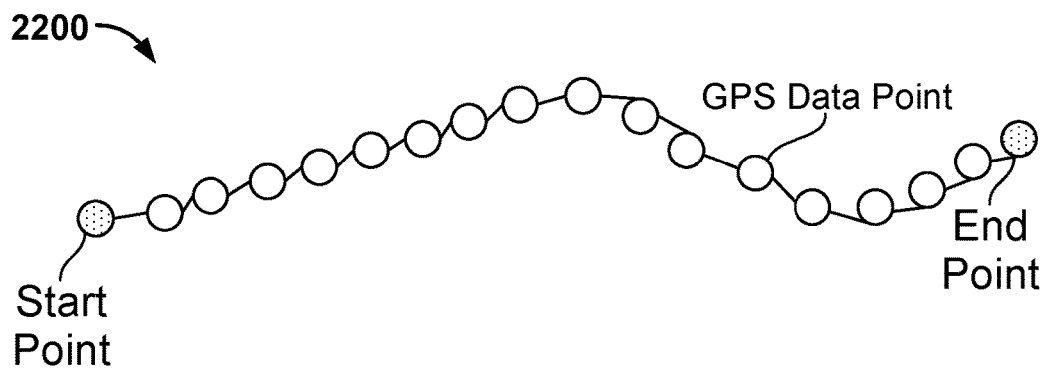
FIGS. 22A through 22F show examples of repairing a segment using process 2100 of FIG. 21.
Figure 22B:
Figure 22C:
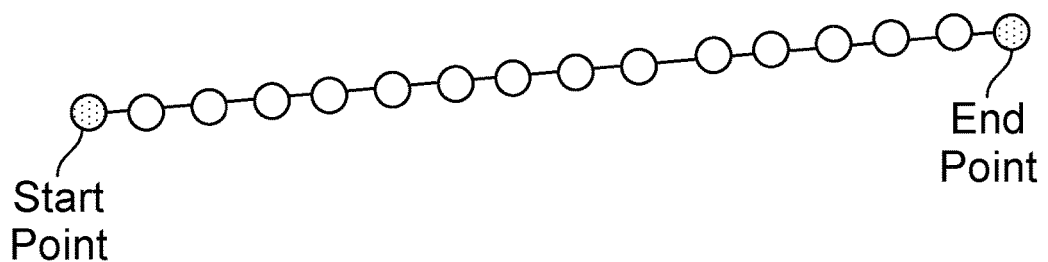
Figure 22D:
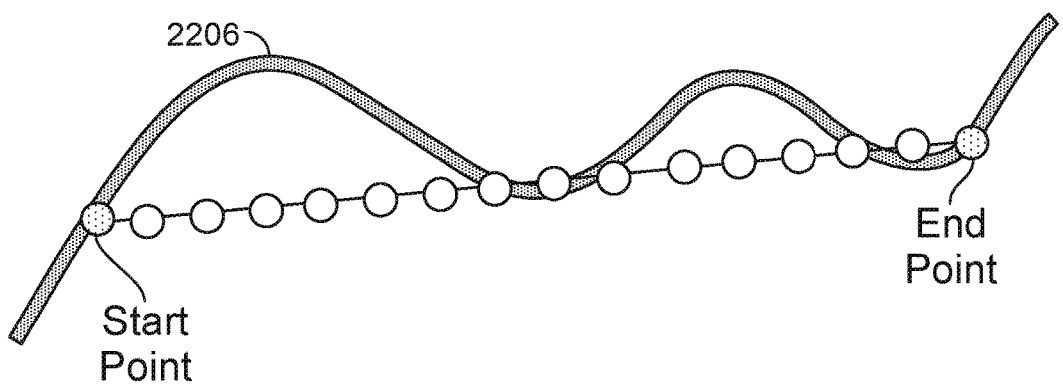
Figure 22E:
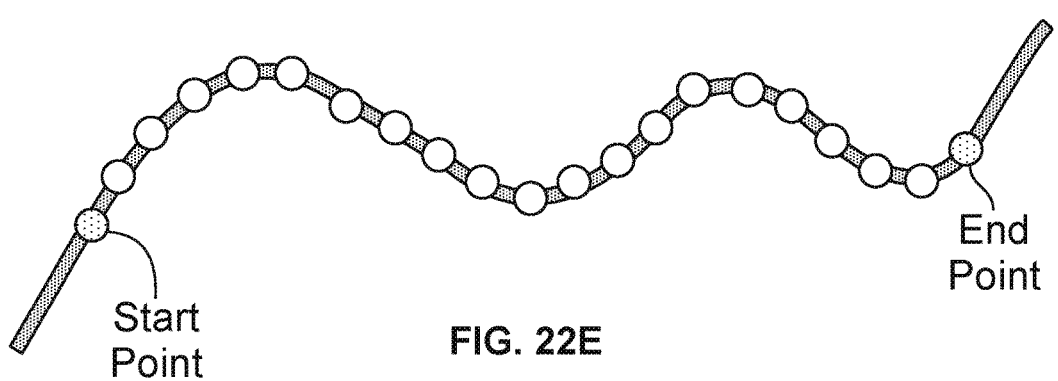
Figure 22F:
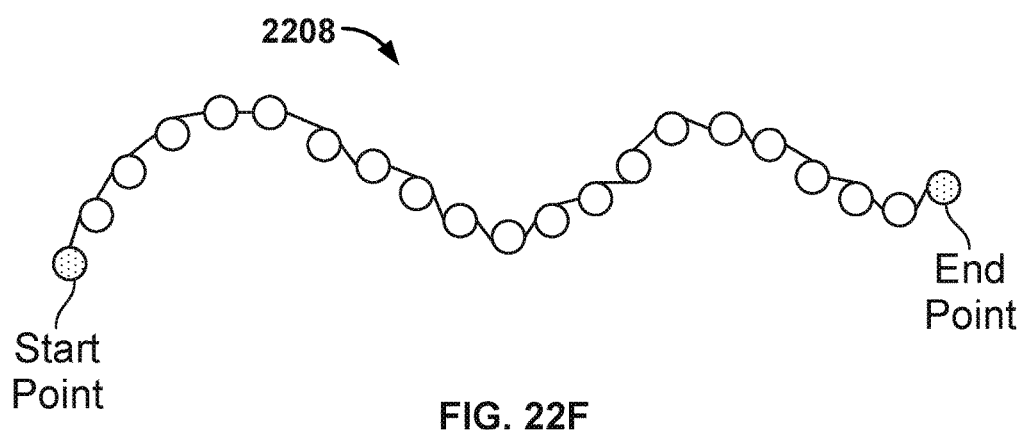

FIG. 22A shows a visual representation of the GPS data points corresponding to a segment being plotted in a two dimensional space. Assume that the space is associated with latitudinal and longitudinal coordinates. Assume that segment 2200 of the example is determined to be repaired. As shown in the example, segment 2200 includes a start point and an end point. FIG. 22B shows the removal of all but the start point and the end point of the segment. FIG. 22C shows that a linear path has been created between the start point and the end point of the original segment. In the example, the linear path comprises a series of discrete GPS data points. FIG. 22D shows path 2206, which is included in a repaired base map. Path 2206 is the path in the repaired base map that is determined to be closest to the linear path. In the example, path 2206 happens to cross through the start point and the end point of the original segment. FIG. 22E shows adjusting the linear path based on path 2206. In the example, each GPS data point of the linear path is moved to the closest location of path 2206 such that the adjusted path between the start point and the end point of the original segment mimics the shape of path 2206. FIG. 22F shows the replacement segment. Replacement segment 2208 represents the GPS data of the replacement segment that is the result of repairing the original segment, segment 2200 of FIG. 22A. In some embodiments, replacement segment 2208 replaces segment 2200.

In various embodiments, efforts are repaired so that they can more likely match each segment that they should match. Best performance portions may also be more accurately determined for repaired efforts. Different types of errors determined in efforts may be handled slightly differently. FIGS. 23 through 27 show examples of repairing an effort that is determined to include various different types of errors. However, the described errors are merely examples and efforts may be detected to have additional and different types of errors that may be repaired in manners similar to those described herein.

Figure 23:
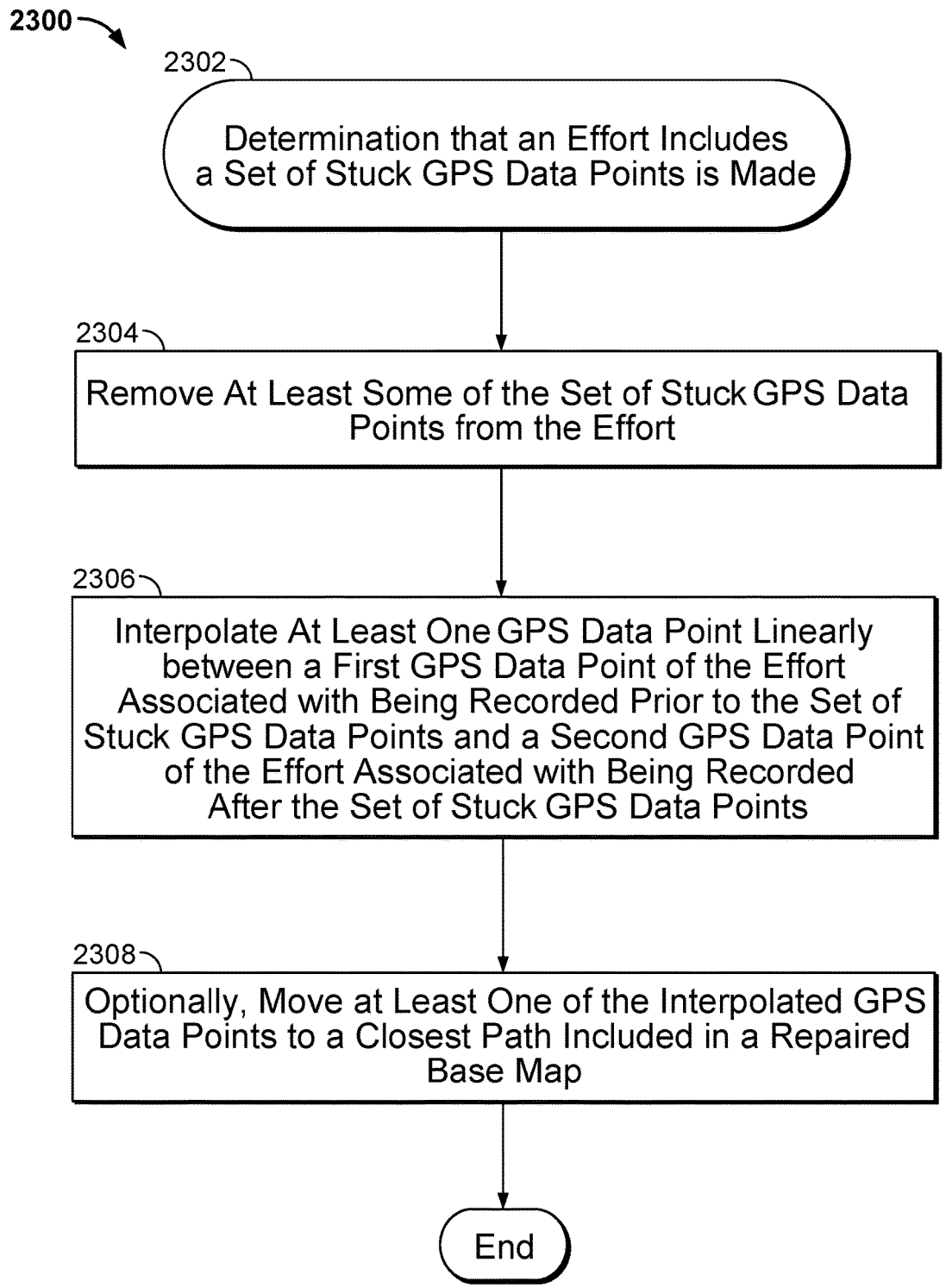
FIG. 23 is a flow diagram showing an embodiment of a process for repairing an effort that is determined to include stuck GPS data points.

FIG. 23 is a flow diagram showing an embodiment of a process for repairing an effort that is determined to include stuck GPS data points. In some embodiments, process 2300 is implemented at system 1400 of FIG. 14. In some embodiments, 1706 and 1708 of process 1700 of FIG. 17 are implemented using at least process 2300.

At 2302, a determination that an effort includes a set of stuck GPS data points has been made. In some embodiments, an effort may be examined for certain patterns and signatures associated with particular types of errors. For example, the type of error associated with a set of stuck GPS data points may be determined by finding a set of GPS data points associated with very low, or zero, speed and acceleration followed by the leapfrog effort when the GPS-enabled device reacquires a good location—spanning the entire distance covered while all stuck points were recorded only in the time-span of the last two recorded points. A visual representation of a set of stuck GPS data points resembles several GPS data points stacked upon each other.

At 2304, at least some of the set of stuck GPS data points are removed from the effort. In some embodiments, the associated data (e.g., timestamps and corresponding measurements associated with environment, physiology, and/or performance) of the removed GPS data points is also discarded.

At 2306, at least one GPS data point is interpolated linearly between a first GPS data point of the effort associated with being recorded prior to the set of stuck GPS data points and a second GPS data point of the effort associated with being recorded after the set of stuck GPS data points. GPS data points are interpolated (e.g., inserted) linearly between the GPS data point of the effort recorded immediately before the removed stuck GPS data points and the GPS data point of the effort recorded immediately after the removed stuck GPS data points. In some embodiments, there are as many GPS data points interpolated as there were removed during 2304.

At 2308, at least one of the interpolated GPS data points is optionally moved to a closest path included in a repaired base map. In some embodiments, a closest path included in a relevant repaired base map may be first identified. Then, each of the interpolated GPS data points may be sequentially moved (snapped on) to this path. In some embodiments, each of the interpolated GPS data points is moved to a closest location along the identified path. In some embodiments, once the interpolated points are moved, the interpolated portion of the effort should resemble the shape of the identified path included in the repaired base map. This way, the shape of the effort should at least conform to an accurate representation of a known path. In some embodiments, at least some auxiliary data (e.g., timestamps corresponding measurements associated with environment, physiology, and/or performance) are extrapolated for the moved interpolated GPS data points.

FIGS. 24A through 24D show examples of repairing an effort with stuck GPS data points using a process such as process 2300 of FIG. 23.

Figure 24A:
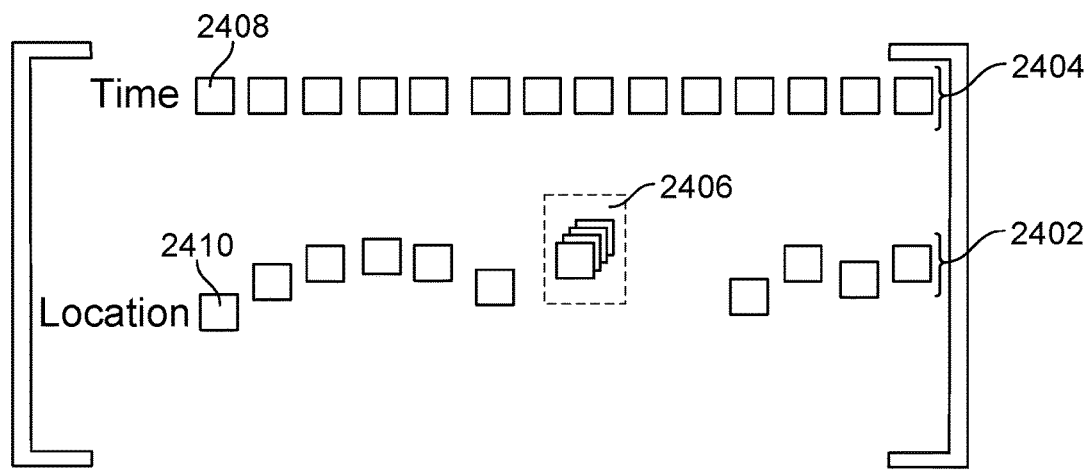
FIGS. 24A through 24D show examples of repairing an effort with stuck GPS data points using a process such as process 2300 of FIG. 23.
Figure 24B:
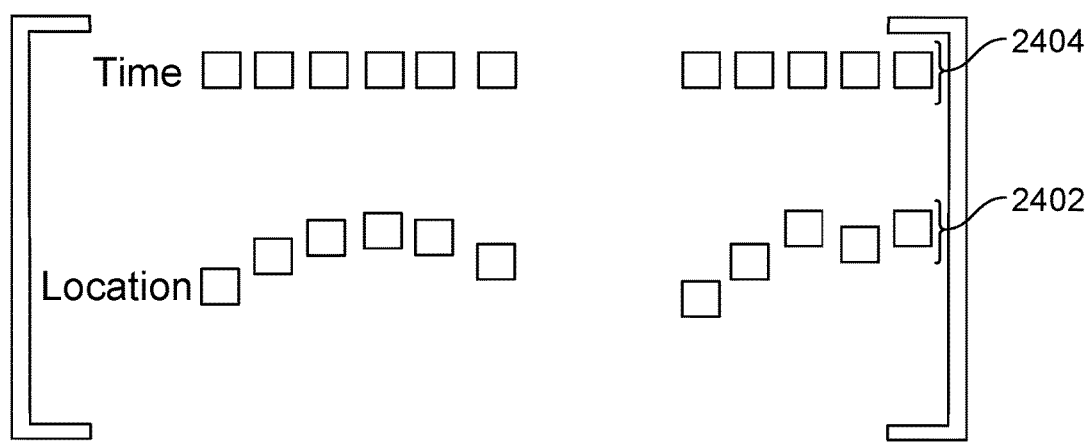
Figure 24C:
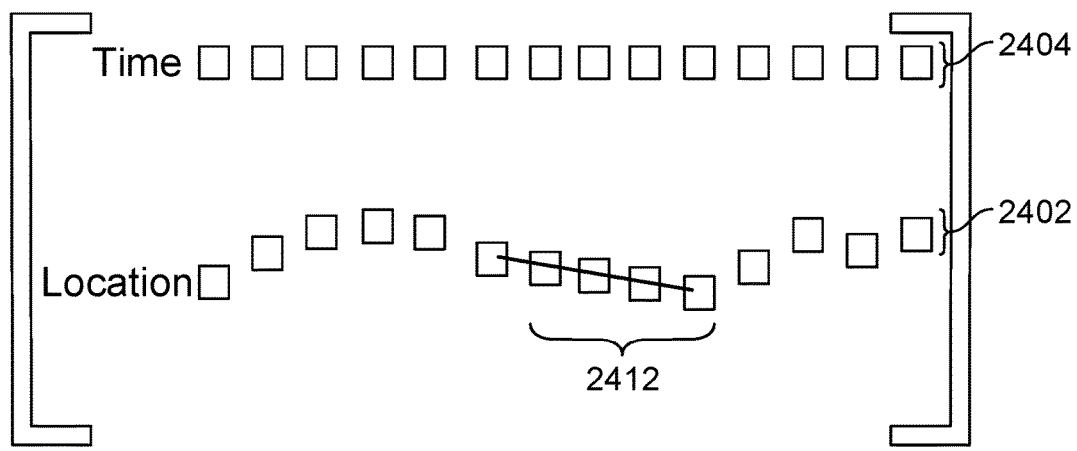
Figure 24D:
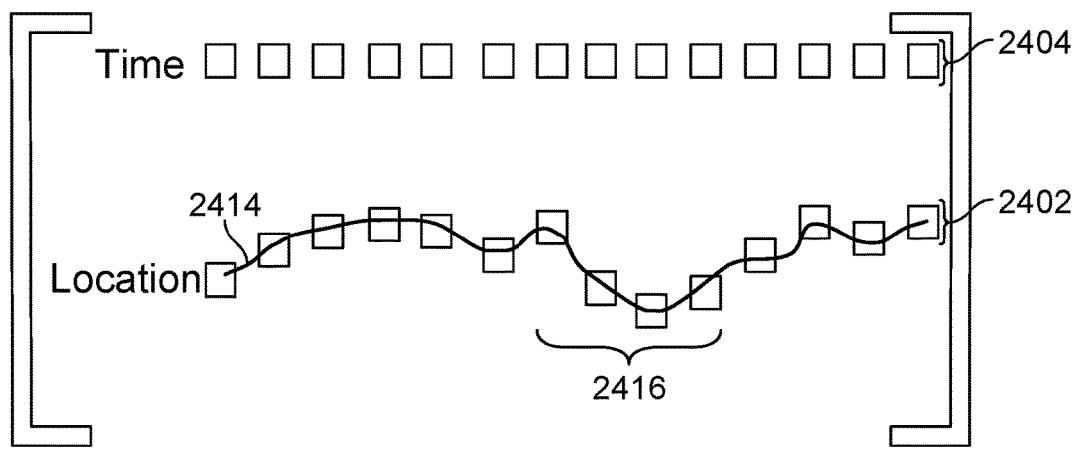

FIG. 24A shows a diagram of a visual representation of an effort and corresponding timestamps. Effort 2402 represents an effort and includes a series of GPS data points recorded during a physical activity. In the example, each of timestamps 2404 represents a timestamp corresponding to each of the GPS data points of effort 2402. For example, timestamp 2408 corresponds to the time at which GPS data point 2410 was recorded by a GPS-enabled device. Set of stuck points 2406, which includes multiple GPS data points that are recorded in a stacked manner, are included in effort 2402. Set of stuck points 2406 is to be repaired, as will be described below. FIG. 24B shows that each of set of stuck points 2406 has been removed from effort 2402. The timestamps corresponding to set of stuck points 2406 have also been removed from timestamps 2404. FIG. 24C shows linearly interpolated GPS data points in the effort. In the example, the gap in effort 2402 that was created by the removed set of stuck points now includes a linear interpolation of several GPS data points, set of GPS data points 2412. In other words, set of GPS data points 2412 has been linearly interpolated between the GPS data point recorded immediately before the first removed stuck GPS data point and the GPS data point recorded immediately after the last removed stuck GPS data point. In the example, the same number of GPS data points that were removed is interpolated. In the example, corresponding timestamps are generated for the interpolated GPS data points. FIG. 24D shows moving the interpolated GPS data points to a path included in a repaired base map. In the example, path 2414 represents a path included in a repaired base map. In the example, each of the interpolated GPS data points is snapped onto a location on path 2414 to form repaired portion 2416. In some embodiments, each of the interpolated GPS data points is moved to a closest location on path 2414 to form repaired portion 2416. After determining repaired portion 2416, effort 2402 is considered to be repaired in some embodiments.

Figure 25:
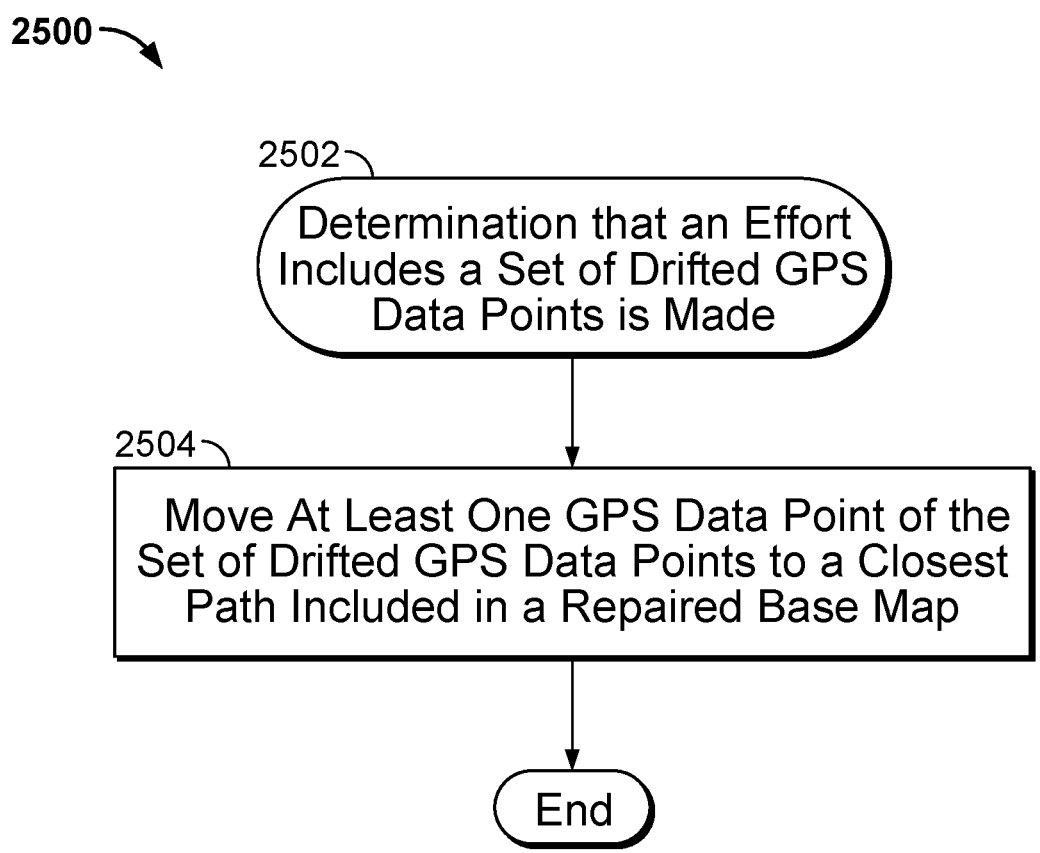
FIG. 25 is a flow diagram showing an embodiment of a process for repairing an effort that is determined to include drifted GPS data points.

FIG. 25 is a flow diagram showing an embodiment of a process for repairing an effort that is determined to include drifted GPS data points. In some embodiments, process 2500 is implemented at system 1400 of FIG. 14. In some embodiments, 1706 and 1708 of process 1700 of FIG. 17 are implemented using at least process 2500.

At 2502, a determination that an effort includes a set of drifted GPS data points has been made. In some embodiments, an effort may be examined for certain patterns and signatures associated with particular types of errors. For example, the type of error associated with a set of drifted GPS data points may be determined by manual observation that a visual representation of the effort shows that it clearly deviates from a plausible path or road. In another example, the type of error associated with a set of drifted GPS data points may be automatically detected if at least a portion of an effort does not fall within corridors of known paths included in a repaired base map. Drifted GPS data points in an effort can exaggerate the distance that a user actually traveled during the recorded physical activity.

At 2504, at least one GPS data point of the set of drifted GPS data points is moved to a closest path included in a repaired base map. In some embodiments, a closest path included in a relevant repaired base map may be first identified. Then, each of the drifted GPS data points may be moved to this path. In some embodiments, each of the drifted GPS data points is sequentially moved (snapped on) to a closest location along the identified path. In some embodiments, once the drifted points are moved, the moved portion of the effort should resemble the shape of the identified path included in the repaired base map. This way, the shape of the effort should at least conform to an accurate representation of a known path.

Figure 26A:
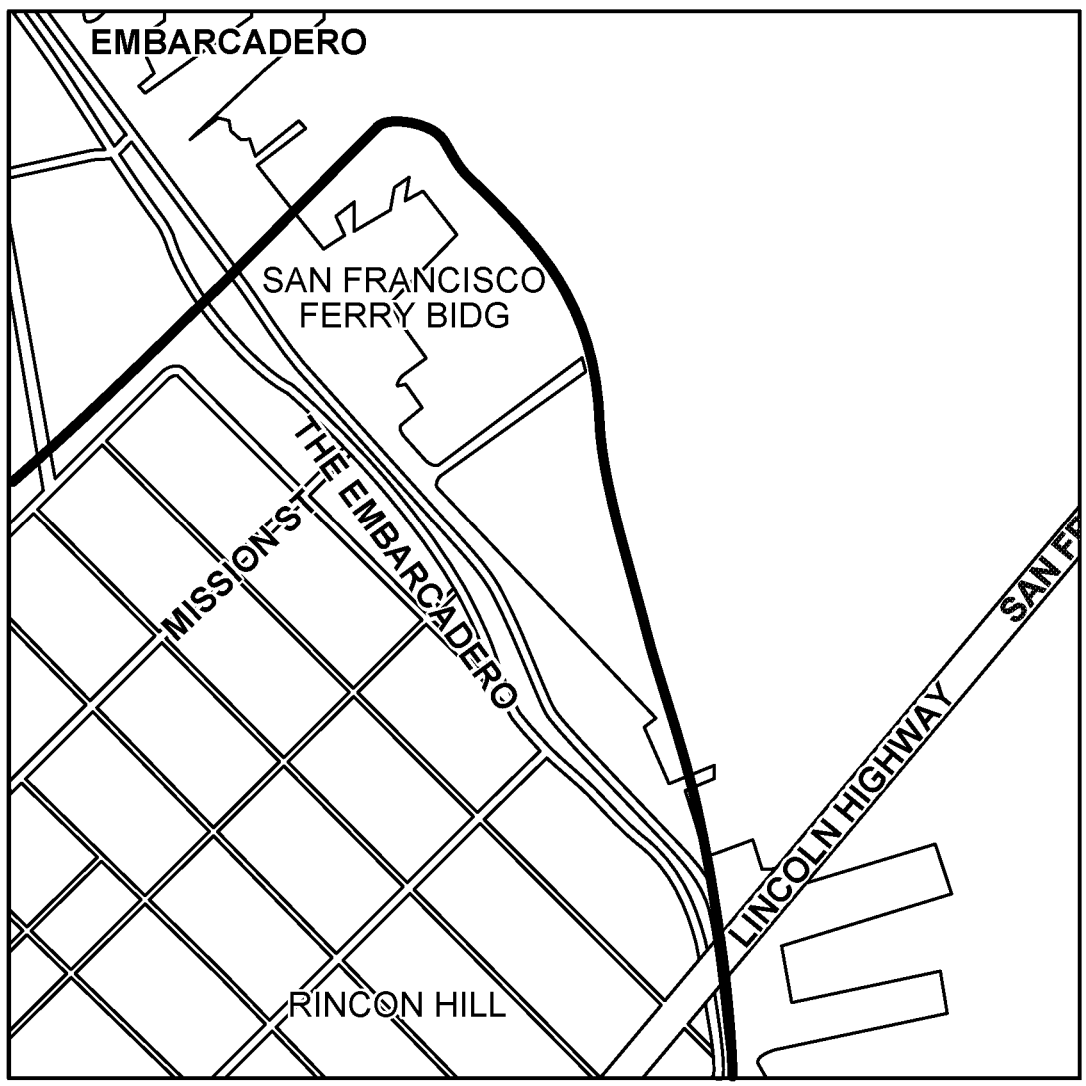
FIGS. 26A and 26B show examples of repairing an effort with drifted GPS data points using a process such as process 2500 of FIG. 25.
Figure 26B:

FIGS. 26A and 26B show examples of repairing an effort with drifted GPS data points using a process such as process 2500 of FIG. 25.

FIG. 26A shows a visual representation of a recorded effort with significant drift on a map application. In the example, the recorded effort, as represented by the dark line, is associated with a bike ride so it is easy to observe that the physical activity has drifted because a portion of the activity appears to take place in the ocean, which is implausible and also does not fall within a corridor of a known path in a repaired base map. As such, at least the portion of the effort associated with drift (into the ocean) is to be repaired, as will be described next. FIG. 26B shows an example of a repaired effort. In the example, the portion of the effort associated with drift (into the ocean) is snapped onto a known road of a repaired base map. The road is labeled as "The Embarcadero" in the example and various GPS data points of the effort have been moved to locations on the road, thereby repairing the effort.

Figure 27:
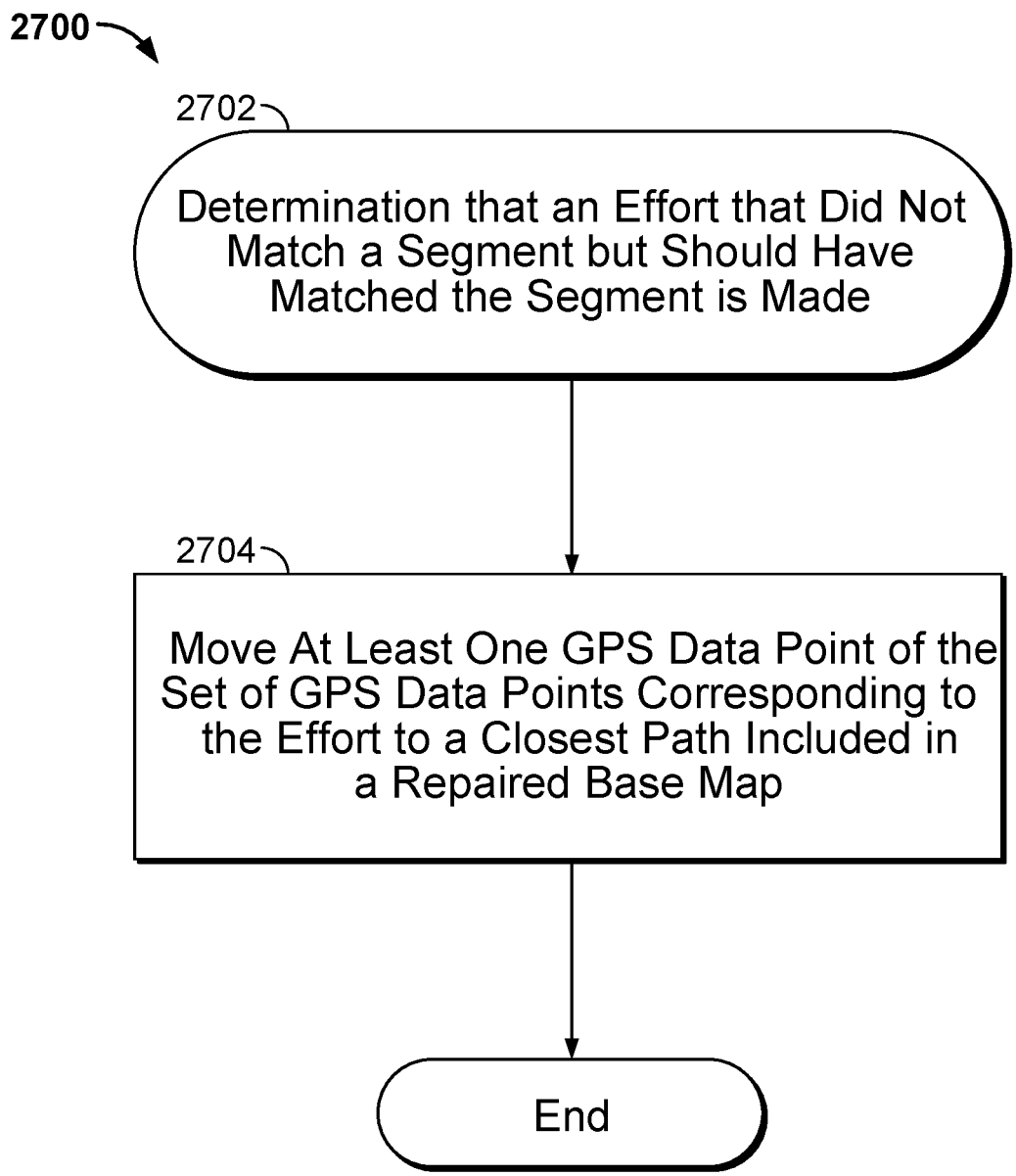
FIG. 27 is a flow diagram showing an embodiment of a process for repairing an effort that did not match a segment but should have matched a segment.

FIG. 27 is a flow diagram showing an embodiment of a process for repairing an effort that did not match a segment but should have matched a segment. In some embodiments, process 2700 is implemented at system 1400 of FIG. 14. In some embodiments, 1706 and 1708 of process 1700 of FIG. 17 are implemented using at least process 2700.

At 2702, a determination that an effort that did not match a segment but should have matched the segment has been made. A first example of determining an effort that did not match a segment but should have matched the segment may be automatically performed by determining that if the effort traversed from point A to point B, then it must have been unavoidable for the effort to traverse across the segment. A second example of determining an effort did not match a segment but should have matched the segment may be determined based on a receipt of an indication from a user associated with the effort that the user knowingly traversed the stored segment that the recorded effort was not determined to match.

At 2704, at least one GPS data point of the set of GPS data points corresponding to the effort is moved to a closest path included in a repaired base map. In some embodiments, a closest path included in a relevant repaired base map may be first identified. Then, each of at least some of the GPS data points of the effort may be moved to this path. In some embodiments, each of the at least some of the GPS data points is sequentially moved (snapped on) to a closest location along the identified path. In some embodiments, once the points are moved, then at least a portion of the effort should resemble the shape of the identified path included in the repaired base map. This way, the shape of the effort should at least conform to an accurate representation of a known path.

Figure 28A:
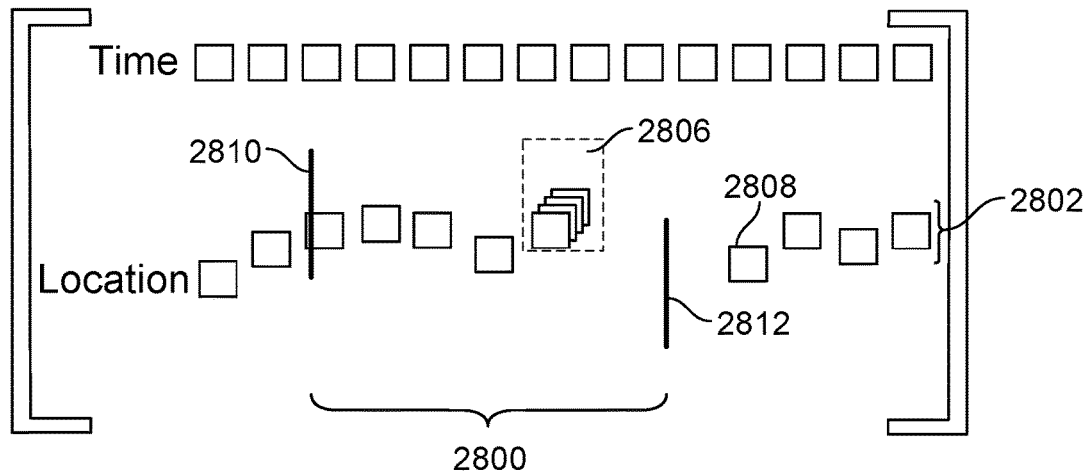
FIGS. 28A and 28B provide examples of determining a best performance portion of an unrepaired and a repaired effort, respectively.
Figure 28B:
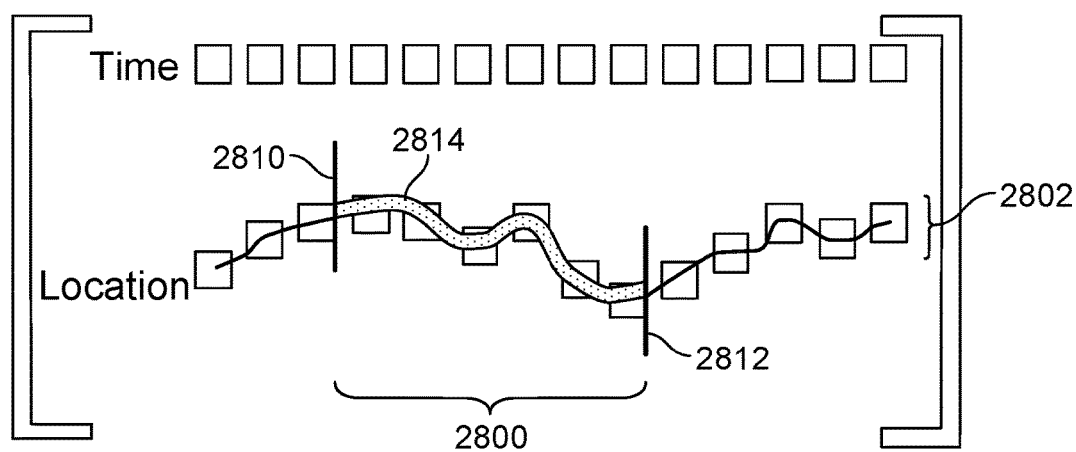

Repaired efforts may be used to more accurately determine user performances across the effort such as the best performance portion. FIGS. 28A and 28B provide examples of determining a best performance portion of an unrepaired and a repaired effort, respectively.

FIG. 28A is a diagram showing an example of determining a best performance portion of an unrepaired effort. In the example, effort 2802, which includes a series of discrete GPS data points, includes set of stuck GPS data points 2806. Set of stuck GPS data points 2806 is likely produced due to the GPS-enabled device losing satellite signal and then regaining the signal when it recorded GPS data point 2808. As a result, a gap in the GPS data points exists across several timestamps between set of stuck GPS data points 2806 and GPS data point 2808. Because the best performance portion of an effort may be thought of as a window of a predetermined distance associated with the best performance (with respect to a particular measurement such as speed) of the effort, best performance portion window 2800 bounded by the start of window 2810 to end of window 2812 may be thought of as a sliding window across effort 2802 that aims to capture a window of best performance. However, due to the gap present in unrepaired effort 2802, if end of window 2812 were located inside the gap, then the user would not be adequately credited for the distance that he or she traveled while the GPS-enabled device was generating the stuck GPS points. Similarly, window 2810 could not start from inside the gap. Furthermore, even if the best performance portion could be determined to include the gap inside best performance portion window 2800, the determination would give an inaccurate representation of the user's performance with respect to that portion of the effort. As such, the presence of error such as set of stuck GPS data points 2806 in an effort makes it difficult to accurately ascertain a best performance portion of the effort.

FIG. 28B is a diagram showing an example of determining a best performance portion of a repaired effort. In the example, effort 2802 has been repaired such that the set of stuck GPS data points have been removed and replaced with a new set of GPS data points. As a result, best performance portion window 2800 is free to slide across the entire effort 2802 to determine a portion of the effort associated with the best performance. In the example, portion 2814 of repaired effort 2802 is determined to be the best performance portion of the effort. In some embodiments, if a best performance portion had been determined for effort 2802 prior to repairing it (e.g., as effort 2802 is depicted in FIG. 28A), then the previous best performance portion determination is replaced by a new best performance portion determination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to repair an effort, comprising:
  a processor configured to:
    determine that the effort includes inaccurate GPS data, comprising to:
      determine a type of error associated with the effort; and
      determine an identified activity type associated with the effort; and
    modify at least a portion of a plurality of GPS data points associated with the effort, comprising to:
      obtain a repaired base map corresponding to the identified activity type, wherein the repaired base map corresponding to the identified activity type is generated based at least in part on historical physical activities associated with the identified activity type; and
      repair the effort based on the type of error and the repaired base map corresponding to the identified activity type; and
  a memory coupled to the processor and configured to provide the processor with instructions.

2. The system of claim 1, wherein the processor is further configured to determine a best performance portion associated with the modified at least portion of the plurality of GPS data points associated with the effort, wherein the best performance portion comprises a portion of modified at least portion of the plurality of GPS data points associated with the effort associated with a best performance with respect to a selected measurement, wherein the best performance portion comprises a predetermined distance.

3. The system of claim 1, wherein the repaired base map corresponding to the identified activity type is generated based at least in part on one or more of the following: user uploaded GPS data comprising the historical physical activities associated with the identified activity type third party GPS data, and GPS data associated with a validated segment.

4. The system of claim 1, wherein the repaired base map corresponding to the identified activity type is generated based at least in part on one or more of the following: user uploaded GPS data comprising the historical physical activities associated with the identified activity type third party GPS data, and GPS data associated with a validated segment, wherein the user uploaded GPS data includes a set of GPS data corresponding to another effort.

5. The system of claim 1, wherein the processor is further configured to determine a best performance portion associated with the modified at least portion of the plurality of GPS data points associated with the effort, wherein the best performance portion comprises a portion of modified at least portion of the plurality of GPS data points associated with the effort associated with a best performance with respect to a selected measurement.

6. The system of claim 1, wherein to modify the at least portion of the plurality of GPS data points associated with the effort is further performed based at least in part on the determined type of error and includes to:
  remove at least some of a set of stuck GPS data points from the at least portion of the plurality of GPS data points associated with the effort; and
  interpolate at least one GPS data point between a first GPS data point of the at least portion of the plurality of GPS data points associated with being recorded prior to the set of stuck GPS data points and a second GPS data point of the at least portion of the plurality of GPS data points associated with the effort associated with being recorded after the set of stuck GPS data points.

7. The system of claim 1, wherein to modify the at least portion of the plurality of GPS data points associated with the effort is further performed based at least in part on the determined type of error and includes to:
  remove at least some of a set of stuck GPS data points from the at least portion of the plurality of GPS data points associated with the effort;
  interpolate at least one GPS data point between a first GPS data point of the at least portion of the plurality of GPS data points associated with being recorded prior to the set of stuck GPS data points and a second GPS data point of the at least portion of the plurality of GPS data points associated with the effort associated with being recorded after the set of stuck GPS data points; and
  move at least one of the interpolated GPS data points to a path included in the repaired base map corresponding to the identified activity type.

8. The system of claim 1, wherein to modify the at least portion of the plurality of GPS data points associated with the effort using the repaired base map corresponding to the identified activity type is further performed based at least in part on the determined type of error and includes to:
    move at least one of a set of GPS data points of the at least portion of the plurality of GPS data points to a path included in the repaired base map corresponding to the identified activity type.

9. The system of claim 1, wherein the processor is further configured to determine whether the modified at least portion of the plurality of GPS data points associated with the effort matches a stored segment.

10. A method to repair an effort, comprising:
    determining that the effort includes inaccurate GPS data, comprising:
        determining a type of error associated with the effort; and
        determining an identified activity type associated with the effort; and
    modifying at least a portion of a plurality of GPS data points associated with the effort, comprising:
        obtaining a repaired base map corresponding to the identified activity type, wherein the repaired base map corresponding to the identified activity type is generated based at least in part on historical physical activities associated with the identified activity type; and
        repairing the effort based on the type of error and the repaired base map corresponding to the identified activity type.

11. The method of claim 10, further comprising determining a best performance portion associated with the modified at least portion of the plurality of GPS data points associated with the effort, wherein the best performance portion comprises a portion of modified at least portion of the plurality of GPS data points associated with the effort associated with a best performance with respect to a selected measurement.

12. The method of claim 10, further comprising determining whether the modified at least portion of the plurality of GPS data points associated with the effort matches a stored segment.

13. The method of claim 10, wherein the repaired base map corresponding to the identified activity type is generated based at least in part on one or more of the following: user uploaded GPS data comprising the historical physical activities associated with the identified activity type third party GPS data, and GPS data associated with a validated segment.

14. The method of claim 10, wherein the repaired base map corresponding to the identified activity type is generated based at least in part on one or more of the following: user uploaded GPS data comprising the historical physical activities associated with the identified activity type, third party GPS data, and GPS data associated with a validated segment, wherein the user uploaded GPS data includes a set of GPS data corresponding to another effort.

15. The method of claim 10, wherein the modifying of the at least portion of the plurality of GPS data points associated with the effort using the repaired base map corresponding to the identified activity type is further performed based at least in part on the determined type of error and includes:
    moving at least one of a set of GPS data points of the at least portion of the plurality of GPS data points to a path included in the repaired base map corresponding to the identified activity type.

16. The method of claim 10, wherein the modifying of the at least portion of the plurality of GPS data points associated with the effort is further performed based at least in part on the determined type of error and includes:
    removing at least some of a set of stuck GPS data points from the at least portion of the plurality of GPS data points associated with the effort; and
    interpolating at least one GPS data point between a first GPS data point of the at least portion of the plurality of GPS data points associated with being recorded prior to the set of stuck GPS data points and a second GPS data point of the at least portion of the plurality of GPS data points associated with the effort associated with being recorded after the set of stuck GPS data points.

17. The method of claim 10, wherein the modifying of the at least portion of the plurality of GPS data points associated with the effort is further performed based at least in part on the determined type of error and includes:
    removing at least some of a set of stuck GPS data points from the at least portion of the plurality of GPS data points associated with the effort;
    interpolating at least one GPS data point between a first GPS data point of the at least portion of the plurality of GPS data points associated with being recorded prior to the set of stuck GPS data points and a second GPS data point of the at least portion of the plurality of GPS data points associated with the effort associated with being recorded after the set of stuck GPS data points; and
    moving at least one of the interpolated GPS data points to a path included in the repaired base map corresponding to the identified activity type.

18. A computer program product to repair an effort, the computer program product comprising a non-transitory computer readable storage medium and comprising computer instructions for:
    determining that the effort includes inaccurate GPS data, comprising:
        determining a type of error associated with the effort; and
        determining an identified activity type associated with the effort; and
    modifying at least a portion of a plurality of GPS data points associated with the effort, comprising:
        obtaining a repaired base map corresponding to the identified activity type, wherein the repaired base map corresponding to the identified activity type is generated based at least in part on historical physical activities associated with the identified activity type; and
        repairing the effort based on the type of error and the repaired base map corresponding to the identified activity type.

\* \* \* \* \*